(12) United States Patent
Wu et al.

(10) Patent No.: US 12,478,951 B2
(45) Date of Patent: Nov. 25, 2025

(54) CYCLOPROPENIMINES FOR ACTIVATION OF CARBON DIOXIDE

(71) Applicants: International Business Machines Corporation, Armonk, NY (US); The Trustees of Columbia University in the City of New York, New York, NY (US)

(72) Inventors: Dino Wu, New York, NY (US); Luis M. Campos, New York, NY (US); Nathaniel H. Park, San Jose, CA (US); James L. Hedrick, Pleasanton, CA (US); Junho Kwon, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 726 days.

(21) Appl. No.: 17/821,074

(22) Filed: Aug. 19, 2022

(65) Prior Publication Data
US 2024/0075454 A1    Mar. 7, 2024

(51) Int. Cl.
*B01J 20/26*     (2006.01)
*B01D 53/62*     (2006.01)
(Continued)

(52) U.S. Cl.
CPC ............. *B01J 20/26* (2013.01); *B01D 53/62* (2013.01); *B01D 53/78* (2013.01); *B01D 53/96* (2013.01);
(Continued)

(58) Field of Classification Search
CPC .... B01J 20/26; B01J 20/3425; B01J 20/3475; B01D 53/62; B01D 53/78; B01D 53/96;
(Continued)

(56) References Cited

U.S. PATENT DOCUMENTS

| 4,372,888 A | 2/1983 | Hjelmeland |
| 5,260,473 A | 11/1993 | McGhee et al. |

(Continued)

FOREIGN PATENT DOCUMENTS

| CN | 106606993 B | 12/2018 |
| FR | 2253051 B1 | 2/1979 |

(Continued)

OTHER PUBLICATIONS

Cabrera-Trujillo, "Aromaticity-enhanced reactivity of geminal frustrated Lewis pairs", 2022, Chemical Communications, Issue 48 (Year: 2022).*

(Continued)

*Primary Examiner* — Anthony J Zimmer
*Assistant Examiner* — Jaanzeb C Raja
(74) *Attorney, Agent, or Firm* — Kelsey M. Skodje

(57) ABSTRACT

A process, composition, and apparatus for carbon dioxide ($CO_2$) conversion are disclosed. The $CO_2$ conversion comprises reacting $CO_2$ with a cyclopropenimine (CPI) to activate the $CO_2$ and transferring the activated $CO_2$ to generate a product of the transferring. The transferring also generates a conjugate acid of the CPI. The process further comprises regenerating the CPI from the conjugate acid.

8 Claims, 14 Drawing Sheets

(51) Int. Cl.
   *B01D 53/78* (2006.01)
   *B01D 53/96* (2006.01)
   *B01J 20/34* (2006.01)
(52) U.S. Cl.
   CPC ....... *B01J 20/3425* (2013.01); *B01J 20/3475* (2013.01); *B01D 2251/206* (2013.01); *B01D 2257/504* (2013.01); *B01D 2258/06* (2013.01)
(58) Field of Classification Search
   CPC ........ B01D 2251/206; B01D 2257/504; B01D 2258/06; B01D 2251/80
   See application file for complete search history.

(56) References Cited

U.S. PATENT DOCUMENTS

| | | | |
|---|---|---|---|
| 8,658,016 | B2 | 2/2014 | Lakkaraju et al. |
| 10,844,016 | B2 | 11/2020 | Werner et al. |
| 2008/0053613 | A1 | 3/2008 | Wang |
| 2013/0230442 | A1 | 9/2013 | Wei et al. |
| 2014/0288323 | A1 | 9/2014 | Lambert et al. |
| 2018/0345207 | A1 | 12/2018 | Custelcean et al. |
| 2020/0384450 | A1 | 12/2020 | Coates et al. |
| 2023/0009671 | A1 | 1/2023 | Park et al. |

FOREIGN PATENT DOCUMENTS

| | | |
|---|---|---|
| WO | 2012169909 A1 | 12/2012 |
| WO | 2013059118 A1 | 4/2013 |

OTHER PUBLICATIONS

Ammann, J., "High-performance Adsorber for Adsorption Heat Pumps," a thesis submitted to attain the degree of Doctor of Sciences of Eth Zurich, 2018, 136 pgs.
Bandar et al., "Cyclopropenimine-Catalyzed Enantioselective Mannich Reactions of tert-Butyl Glycinates with N-Boc-Imines," DOI: 10.1021/ja407277a, J. Am. Chem. Soc. 2013, 135, 32, 11799-11802.
Bandar et al., "Enantioselective Brønsted Base Catalysis with Chiral Cyclopropenimines," DOI: 10.1021/ja3015764, J. Am. Chem. Soc. 2012, 134, 12, 5552-5555.
Bui et al., "Carbon capture and storage (CSS): the way forward," Energy Environ. Sci., 2018, 11, 1062, 115 pgs.
Campos et al, "Cyclopropenimines for Mineralization of Carbon Dioxide," U.S. Appl. No. 17/821,046, filed Aug. 19, 2022.
Cantu et al., "Integrated Solvent Design for CO2 Capture and Viscosity Tuning," Science Direct, Energy Procedia 114 (2017) 726-734.
Custelcean, R., "Iminoguanidines: from anion recognition and separation to carbon capture," Chem. Commun., 2020, DOI: 10.1039/D0CC04332J, 24 pgs.
Engel et al., "A Platform for Analysis of Nanoscale Liquids with an Array of Sensor Devices Based on Two-Dimensional Material," DOI: 10/1021/acs/nanolett/6b03561, © 2017 American Chemical Society, pp. 2741-2746.
Hedrick et al., "Cyclopropeneimines for Capture and Transfer of Carbon Dioxide," U.S. Appl. No. 17/655,198, filed Mar. 17, 2022.
Hedrick et al., "Cyclopropeneimines for Capture and Transfer of Carbon Dioxide," U.S. Appl. No. 17/655,206, filed Mar. 17, 2022.
International Energy Agency, "Energy Technology Perspectives 2020," 400 pgs.
Itagaki et al., "Catalytic synthesis of silyl formates with 1 atm of CO2 and their utilization for synthesis of formyl compounds and formic acid," Journal of Molecular Catalysis A: Chemical, vol. 366, Jan. 2013, pp. 347-352.
Koech et al., "Reinventing design principles for developing low-viscosity carbon dioxide binding organic liquids (CO2BOLs) for flue gas clean up," Chemistry & Sustainability, ChemSusChem 10.1002/cssc.201601622, 9 pgs.
Kortunov et al., "In Situ Nuclear Magnetic Resonance Mechanistic Studies of Carbon Dioxide Reactions with Liquid Amines in Mixed Base Systems: The Interplay of Lewis and Bronstead Basicities," energy&fuels, https://pubs.acs.org, doi: 10.102/acs.energyfuels.5b00988, Aug. 6, 2015, 23 pgs.
Li et al., "A robust metal organic framework for dynamic light-induced swing adsorption of carbon dioxide," Chem. Eur. J. 10.1002/chem.201602671, 6 pgs.
List of IBM Patents or Patent Applications Treated as Related, Aug. 17, 2022, 2 pgs.
Liu et al., "Insight into Capture of Greenhouse Gas (CO2) based on Guanidinium Ionic Liquids," Chin J. Chem. Phys. 27, 144 (2014), https://doi.org/10/1063/1674-0068/27/02/144-148, 6 pgs.
Malhotra et al., "Directed Hydrogen Bond Placement: Low Viscosity Amine Solvents for CO2 Capture," 26 pgs.
Murata et al., "Synthesis of silyl formates, formamides, and aldehydes via solvent-free organocatalytic hydrosilylatio of CO2," https://pubs.rsc.org/en/content/articlelanding/2020/cc/d0cc01371d/unauth, Chemical Communications, Apr. 15, 2020, 5 pgs. (abstract only).
Nacsa et al., ,"Higher-Order Cyclopropenimine Superbases. Direct Neutral Brønsted Base Catalyzed," Michael Reactions with α-Aryl Esters, J Am Chem Soc. Aug. 19, 2015; 137(32): 10246-10253, Published online Aug. 4, 2015. doi: 10.1021/jacs.5b05033.
Notz et al., "Selection and Pilot Plant Tests of New Absorbents for Post-Combustion Carbon Dioxide Capture," DOI: 10.1205/cherd06085, Trans IChemE, Part A, Apr. 2007, 6 pgs.
Puxty et al., "Carbon dioxide post combustion capture: a novel screening study of the carbon dioxide absorption performance of 76 amines," 18 pgs.
Seo et al., "Guanidinium-based Organocatalyst for CO2 Utilization under Mild Conditions," DOI: 10/1002/bkcs. 11672, Bull. Korean Chem. Soc 2019, 4 pgs.
Serdyuk et al., "Synthesis and Properties of Fluoropyrroles and Their Analogues," SYNTHESIS 2012, 44, 2115-2137, Advanced online publication: 9.06.20120039-78811437-210X, DOI: 10.1055/s-0031-1289770; Art ID: SS-2012-E0307-R.
Voice et al., "Oxidation of amines at absorber conditions for CO2 capture from flue gas," Science Direct, Energy Procedia 4 (2011) 171-178.
Wu et al., "Cyclopropenimines for Activation of Carbon Dioxide," U.S. Appl. No. 17/821,094, filed Aug. 19, 2022.
Wu et al., "Universal Reagents for CO2 Capture, Storage, and Upcycling into Value-Added Polymer" [Conference Presentation Abstract] 264th American Chemical Society National Meeting and Exposition, Chicago, IL and Online, Abstract accepted for publication May 26, 2022. https://acs.digitellinc.com/acs/live/28/page/905/1?eventSearchInput=&eventSearchDateTieventSe=&eventSearchDateTimeEnd=&speakerId=201218#sessionCollapse451259, printed Aug. 11, 2022, 1 pg. Grace Period Disclosure.
Xiaocai et al., "Guanidinium-based dicarboxylic acid ionic liquids for SO2," DOI: 10.1002/jctb.5052, 25 pgs.
Yoshida et al.," Substituent Dependence of Imidazoline Derivatives on Capture and Release System of Carbon Dioxide," DOI: 10.1039/C7NJ03133E, Oct. 25, 2017, 9 pgs.
Zheng et al., "A single-component water-lean post-combustion CO2 capture solvent with exceptionally low operational heat and total costs of capture—comprehensive experimental and theoretical evaluation," Energy Environ. Sci. 2020, 13, 4106, 8 pgs.
Bruns et al., "Synthesis and Coordination Properties of Nitrogen(I)-Based Ligands." Angew. Chem. Int. Ed. 2010, 49, 3680-3683, Non-Final Office Action for U.S. Appl. No. 17/655,206, dated Sep. 20, 2023.
Campos et al, "Cyclopropenimines for Mineralization of Carbon Dioxide," U.S. Appl. No. 17/821,046, filed Aug. 19, 2022, 29 pages.
Hedrick et al., "Cyclopropeneimines for Capture and Transfer of Carbon Dioxide," U.S. Appl. No. 17/655,206, filed Mar. 17, 2022, 30 pages.
Hedrick et al., "Cyclopropeneimines for Capture and Transfer of Carbon Dioxide," U.S. Appl. No. 17/655,198, filed Mar. 17, 2022, 31 pages.

(56) References Cited

OTHER PUBLICATIONS

Koech et al., "Reinventing design principles for developing low-viscosity carbon dioxide binding organic liquids (CO2BOLs) for flue gas clean up," Chemistry & Sustainability, ChemSusChem 10.1002/cssc.201601622, First published: Dec. 21, 2016, 9 pgs, https://doi.org/10.1002/cssc.201601622.
Li et al., "A robust metal organic framework for dynamic light-induced swing adsorption of carbon dioxide," Chem. Eur. J. 10.1002/chem.201602671, First published: Jun. 8, 2016, 6 pgs, http://dx.doi.org/10.1002/chem.201602671.
Malhotra et al., "Directed Hydrogen Bond Placement: Low Viscosity Amine Solvents for CO2 Capture," ACS Sustainable Chemistry and Engineering, Publication Date (Web): Mar. 15, 2019, 27 pages, DOI: 10.1021/acssuschemeng.8b05481.
Meng, Xiaocai, et al., "Guanidinium-based dicarboxylic acid ionic liquids for SO2," First published: Jul. 12, 2016, DOI: 10.1002/jctb.5052, 25 pgs.
Puxty et al., "Carbon dioxide post combustion capture: a novel screening study of the carbon dioxide absorption performance of 76 amines," Environ. Sci. Technol. 2009, 43, 16, 6427-6433. Publication Date: Jul. 17, 2009, 18 pgs, https://doi.org/10.1021/es901376a.
Wu et al., "Cyclopropenimines for Activation of Carbon Dioxide," U.S. Appl. No. 17/821,094, filed Aug. 19, 2022, 33 pages.
Klaus, et al., Recent Advances in CO2/epoxide Copolymerization—New Strategies And Cooperative Mechanisms, Coordination Chemistry Reviews, vol. 255, Issues 13-14, Jul. 2011, pp. 1460-1479.

\* cited by examiner

| Polymer | Mean molecular weight $M_n$ | Dispersity $Đ$ | Decomposition temperature $T_{decomp}$ | Glass transition temperature $T_g$ |
|---|---|---|---|---|
| 1A | 44 kDa | 1.84 | 234 °C | 13.5 °C |
| 1B | 4.8 kDa | 1.52 | 261 °C | −7.5 °C |
| 1C | 41 kDa | 2.31 | 226 °C | 60.2 °C |
| 1d | 5.4 kDa | 1.29 | 258 °C | −11.0 °C |
| 1E | 78 kDa | 1.85 | 276 °C | 97.0 °C |
| 1F | 17 kDa | 2.31 | 240 °C | 52.5 °C |
| 1G | 64 kDa | 1.94 | 215 °C | 108 °C |
| 1H | 4.5 kDa | 1.46 | 258 °C | 87.6 °C |

FIG. 12

| Polymer | Mean molecular weight $M_n$ | Dispersity $\mathit{Đ}$ | Decomposition temperature $T_{decomp}$ | Glass transition temperature $T_g$ |
|---|---|---|---|---|
| 2A | 93 kDa | 1.71 | 231 °C | 50.0 °C |

CYCLOPROPENIMINES FOR ACTIVATION OF CARBON DIOXIDE

STATEMENT REGARDING PRIOR DISCLOSURES BY THE INVENTOR OR A JOINT INVENTOR

The following disclosure is submitted under 35 U.S.C. 102(b)(1)(A):

DISCLOSURE: Wu, D., Park, N., Hedrick, J., Campos, L. "Universal Reagents for $CO_2$ Capture, Storage, and Upcycling into Value-Added Polymer" [Conference Presentation Abstract] 264$^{th}$ American Chemical Society National Meeting and Exposition, Chicago, IL and Online, Abstract accepted for publication May 26, 2022. https://acs.digitell-inc.com/acs/live/28/page/905/1?eventSearchInput=&eventSearchDateTieventSe=&eventSearchDateTimeEnd=&speakerId=20 1218#session-Collapse451259, printed Aug. 11, 2022, 1 pg.

BACKGROUND

The present disclosure relates to carbon dioxide ($CO_2$) capture and transfer and, more specifically, to generating polymers using $CO_2$ captured and activated by cyclopropenimine (CPI) compounds.

Techniques for capturing atmospheric $CO_2$ (e.g., direct-air-capture (DAC)) can be used to offset $CO_2$ emissions. Current DAC technologies generally involve sorption materials, which can absorb $CO_2$ gas at atmospheric levels and then desorb the gas as an isolated stream in specified intervals. Techniques for transferring and chemically transforming $CO_2$ can be used to produce synthetically useful compounds. For example, captured $CO_2$ may be used as a feedstock in the synthesis of polymeric materials. Upcycling $CO_2$ into useful monomers may also facilitate a shift in production away from standard, fossil fuel intensive approaches that employ highly toxic chemicals, such as phosgene.

SUMMARY

Various embodiments are directed to a process of carbon dioxide ($CO_2$) conversion. The process includes reacting the $CO_2$ with a cyclopropenimine (CPI) to activate the $CO_2$, transferring the activated $CO_2$ to generate a product of the transfer and a conjugate acid of the CPI. This can provide a way to capture $CO_2$ and generate useful chemicals from renewable and abundant sources. The process further includes recovering the CPI from the conjugate acid. Recovery of the CPI can provide a reusable material for capturing $CO_2$, which may allow large-scale $CO_2$ capture. In some embodiments, the CPI can be recovered by adding an aqueous base to a solution of the conjugate acid, such as a solution of the conjugate acid in an organic solvent. This may allow the reaction to be carried out under mild conditions with readily available solvents. In some embodiments, the product of the transferring is a polycarbonate, a polyurethane, or a metal carbonate. This can provide low-cost, practical avenues to manufacturing useful materials from renewable sources.

Further embodiments are directed to a composition and an apparatus for carrying out the process of $CO_2$ conversion.

The above summary is not intended to describe each illustrated embodiment or every implementation of the present disclosure.

BRIEF DESCRIPTION OF THE DRAWINGS

The drawings included in the present application are incorporated into, and form part of, the Specification. They illustrate embodiments of the present disclosure and, along with the description, serve to explain the principles of the disclosure. The drawings are only illustrative of certain embodiments and do not limit the disclosure.

FIG. 12 is a table illustrating experimental data characterizing polymer products formed in the experimental examples of FIGS. 11A and 11B.

Figure 1:
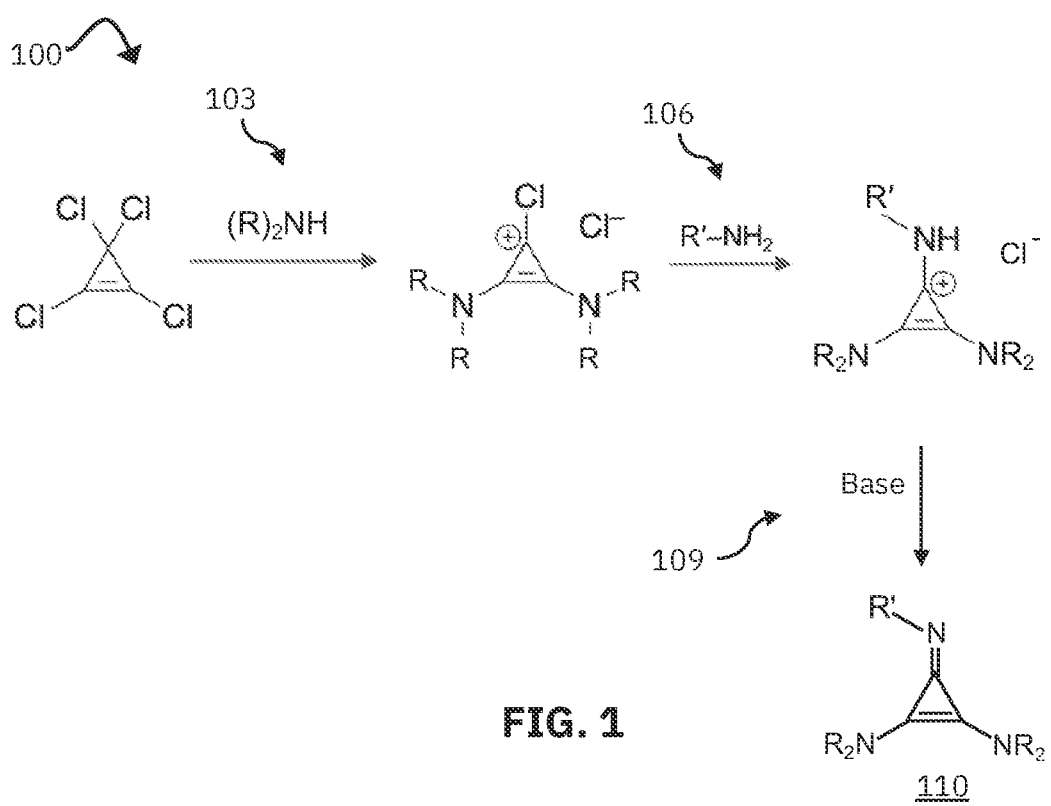
FIG. 1 is a chemical reaction diagram illustrating a process of forming a cyclopropenimine (CPI), according to some embodiments.

While the invention is amenable to various modifications and alternative forms, specifics thereof have been shown by way of example in the drawings, and will be described in detail. It should be understood, however, that the intention is not to limit the invention to the particular embodiments described. Instead, the intention is to cover all modifications, equivalents, and alternatives falling within the spirit and scope of the invention.

DETAILED DESCRIPTION

Embodiments of the present invention are generally directed to carbon dioxide ($CO_2$) capture and transfer and, more specifically, to generating polymers using $CO_2$ captured and activated by cyclopropenimine (CPI) compounds. While the present disclosure is not necessarily limited to such applications, various aspects of the disclosure may be appreciated through a discussion of examples using this context.

Techniques for reducing atmospheric $CO_2$ are essential for the goal of limiting the global temperature rise to 1.5° C. by 2050. Current emissions at about 35 metric gigatons per year (Gt/yr) are expected to rise to ~40-45 Gt/yr by 2050. Point source capture, zero-emission technologies, such as renewables for energy production, and reduced-emission programs are expected to lower emissions (e.g., by about 800-900 Mt/yr). However, these efforts cannot offset $CO_2$ from long distance travel/cargo transport and certain heavy industries (expected to account for 15+% emissions annually), nor can they remove already-emitted $CO_2$ from the atmosphere.

Negative emissions using DAC may overcome these challenges. Current DAC technologies generally involve sorption materials, which can absorb $CO_2$ gas at atmospheric levels and then desorb the gas as an isolated stream in specified intervals. Upcycling $CO_2$ into useful monomers would also facilitate a shift in production away from standard, fossil fuel intensive approaches that employ highly toxic chemicals, such as phosgene. However, challenges remain in scaling DAC sufficiently. For example, current atmospheric loading of $CO_2$ is a dilute 415 ppm, but the estimated total carbon load in the atmosphere is 900+Gt.

Current chemisorption technologies used for point-of-generation capture of about 5-30% by volume can require 2-4 gigajoules (GJ) per metric ton (t) of $CO_2$, while existing commercially available DAC technologies can use ~12 GJ/t of $CO_2$ at atmospheric concentrations. The regeneration energy needed to release $CO_2$ from capture reagents dominates the energy costs. As an example, current amine-scrubbing plants use aqueous solutions that capture $CO_2$ at about 25-40° C. and release $CO_2$ at about 100-150° C., with flow rates of thousands of tons per hour, thus requiring heating and cooling of significant quantities of fluid. Recent approaches to $CO_2$ capture, including solid-phase chemisorption and water-lean systems, have not sufficiently reduced these regeneration energies and can suffer from scalability and stability issues. A key chemical challenge remains to produce new molecules that can capture $CO_2$ and regenerate/release the captured $CO_2$ with a minimum energy budget.

Taking the challenge beyond lowering the energetic penalties in DAC, the ability to convert $CO_2$ into useful polymers, minerals, functional molecules, biodegradable plastics, and consumable products at scale demands the development of new chemistries that allow efficient $CO_2$ capture and require less energy for release/storage. Therefore, we face an urgent need for new catalysts and reagents that operate efficiently at or about standard/room temperature and pressure, while reducing the overall regeneration energy costs. Such molecules could enable DAC systems that operate under dilute concentrations of $CO_2$ (e.g., ambient conditions).

There is also a need for new ways of efficiently generating common polymers (e.g., polyurethanes, polycarbonates, etc.) without requiring hazardous or non-renewable materials. For example, polyurethanes (PUs) are considered highly versatile and one of the most important classes of polymeric materials. Unfortunately, conventional polyurethane synthesis necessitates the use of isocyanate monomers, which can be toxic and sensitive to moisture. Because of these and other disadvantages, there is an emerging interest in finding a sustainable approach toward non-isocyanate polyurethanes (NIPUs).

Various embodiments of the present disclosure may be used to overcome these and other challenges. Disclosed herein are cyclopropenimine (CPI)-based molecules and polymers ("CPIs") that may be used for upcycling and capture of $CO_2$. For example, CPIs can act as $CO_2$-transfer/activation agents for permanent storage of $CO_2$ in a process of mineralization from sea water. CPIs can also be used to activate $CO_2$ to be used in the synthesis of polymers such as polycarbonates and polyurethanes without isocyanate. In some embodiments, the CPIs can capture $CO_2$ from dilute sources under mild conditions without requiring an external stimulus (e.g., heat, electrochemical stimuli, etc.). This $CO_2$ capture results in formation of adducts with $CO_2$ (CPI-$CO_2$ adducts), which can "activate" $CO_2$ for subsequent chemical transformations. In some embodiments, the activated $CO_2$ (e.g., carbonate, bicarbonate, etc.) can be released from the CPI-$CO_2$ adducts for regeneration/restoration of the CPIs in a low energy semi-automated process.

The disclosed CPIs can be superbasic (e.g., having conjugate acids with $pK_{BH^+}$~27-28) due to aromatic stabilization from the cyclopropenium ion. Additionally, the CPIs may be synthesized on a large scale from readily available, inexpensive substrates and processed into emulsions, membranes, particles, etc. that may be integrated within $CO_2$ reactors. Such materials may enable DAC systems that operate at ambient conditions using localized, renewable energy sources.

Referring now to the drawings, in which like numerals represent the same or similar elements, FIG. 1 is a chemical reaction diagram illustrating a process 100 of forming a CPI 110, according to some embodiments. Herein, "CPI" refers to a bis(amino)CPI species unless otherwise indicated. The CPI 110 illustrated in FIG. 1 can be a CPI molecule where R and R' are organic substituents (see below). Process 100 can involve a first step 103 wherein tetrachlorocyclopropene is reacted with a secondary amine $R_2NH$ (e.g., dicyclohexylamine, where R=cyclohexyl ("Cy")) in a solvent such as dichloromethane (DCM). In a second step 106, the resulting diamine chloride salt can be reacted with a primary amine R'—$NH_2$ to form a CPI conjugate acid chloride (CPI-$H^+$/$Cl^-$). In a third step 109, basification of the conjugate acid CPI-$H^+$ yields the CPI. The ability to vary R and R' groups based on secondary and primary amine selection provides modularity to the CPI core by allowing tuning of parameters such as reactivity, solubility, etc. Examples and effects of R and R' groups are discussed in greater detail below.

Figure 2:
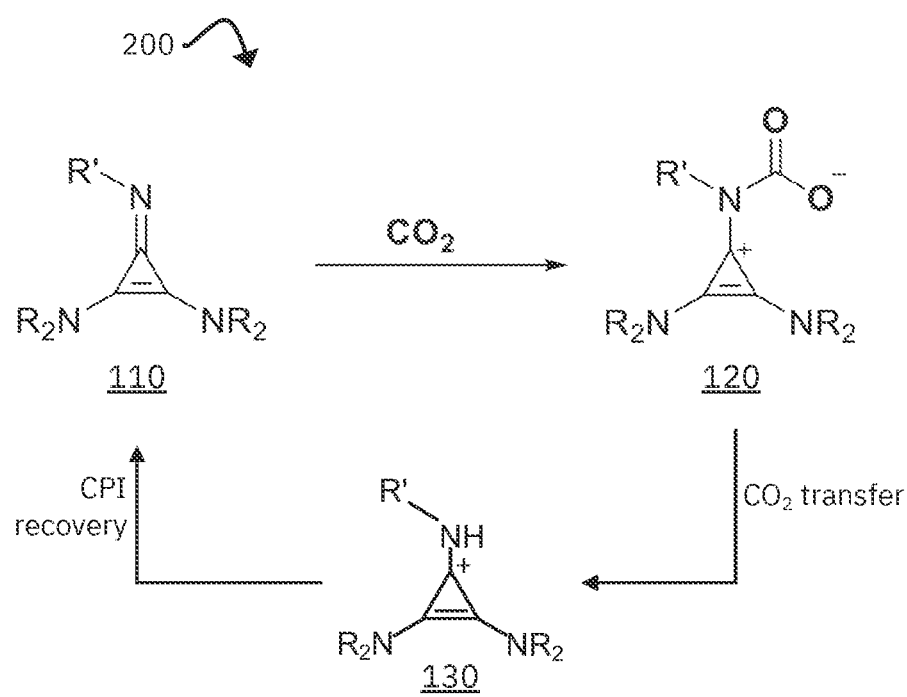
FIG. 2 is a chemical reaction diagram illustrating a process of forming a CPI-carbon dioxide (CPI-$CO_2$) adduct, according to some embodiments.

FIG. 2 is a chemical reaction diagram illustrating a process 200 of forming a CPI-$CO_2$ adduct 120, according to some embodiments. In process 200, CPI 110 can be reacted with $CO_2$ gas to form the CPI-$CO_2$ adduct 120. The $CO_2$ can come from direct sources such as substantially pure $CO_2$ (e.g., ~100% $CO_2$), $CO_2$/inert gas mixtures (e.g., ~20-99% $CO_2$), etc. or dilute sources such as atmospheric gas (e.g., ~0.04% $CO_2$), exhaled air (e.g., ~4% $CO_2$), etc. This reaction may be carried out under ambient conditions. The CPI-$CO_2$ adduct 120 is a zwitterion characterized by an aromatic cyclopropenium (tris(amino)cyclopropenium, or TAC) ion, which can be stabilized by electron-donating amine substituents, and an anionic carbonate. The activated $CO_2$ may be released in a "$CO_2$ transfer" reaction resulting in a carbonate anion ($CO_3^-$) or carbonate ester product (e.g., polycarbonate, polyurethane, etc.) and a conjugate acid of the CPI (CPI-$H^+$ 130). Reactants involved in the $CO_2$ transfer operation are not shown in FIG. 2. However, examples of $CO_2$ transfer reactions are illustrated in FIGS. 8A-12B).

Upon loss of $CO_2$, CPI 110 may be recovered by basification of CPI-H$^+$ 130. In some embodiments, CPI recovery can include a biphasic process discussed in greater detail below (see, e.g., FIG. 8B). The recovered CPI 110 can be reused to react with additional $CO_2$. This is discussed in greater detail with respect to FIGS. 8A-9B. The aromatic stabilization and synthetic modularity of CPIs have enabled their use in catalytic transformations, including Michael additions, Mannich reactions, Wittig rearrangements, and ring-opening polymerization. The cyclopropenium conjugate acids of CPIs have also been utilized as Bronsted acid catalysts in reactions involving additions to oxocarbeniums and hydroamination of alkenes.

Figure 3:
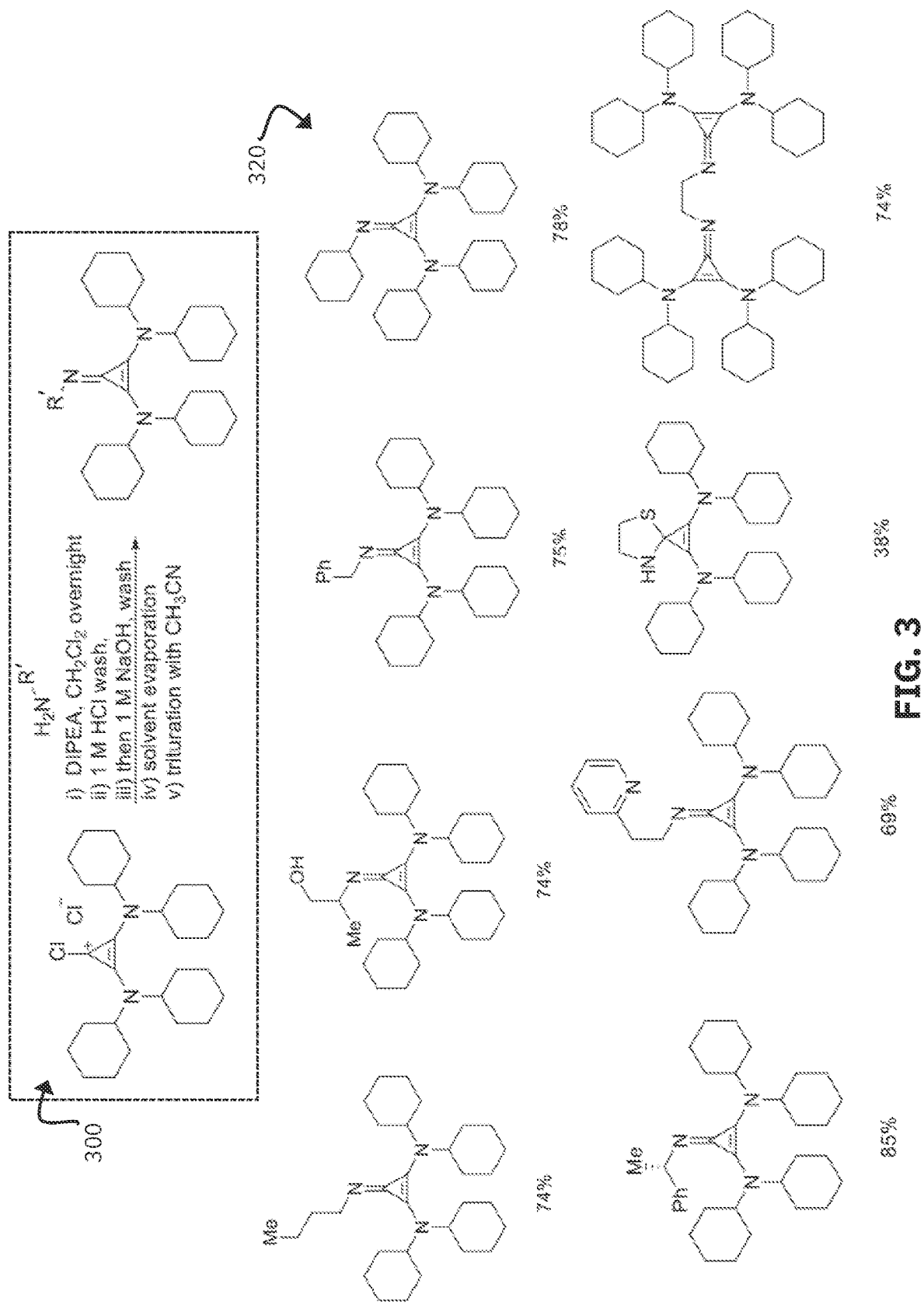
FIG. 3 illustrates experimental examples of a process of CPI formation, according to some embodiments.

FIG. 3 illustrates experimental examples of a process 300 of CPI formation, according to some embodiments. In this example, a diamine was mixed with a selected primary amine (R'—NH$_2$) and N,N'-diisopropylethylamine (DIPEA) in dichloromethane (CH$_2$Cl$_2$) and allowed to react overnight (e.g., step 106 of process 100). The reaction mixture was then washed with 1 M HCl, followed by basification with 1 M NaOH to convert the conjugate acid CPI-H$^{30}$ (not shown) into the CPI (e.g., step 109 of process 100). Process 300 was repeated using different R'—NH$_2$ reactants under substantially similar reaction conditions in order to form a series of CPIs 320, which are shown with their corresponding percent yields. Herein, "Me" represents a methyl group, and "Ph" represents a phenyl group.

Figure 4A:
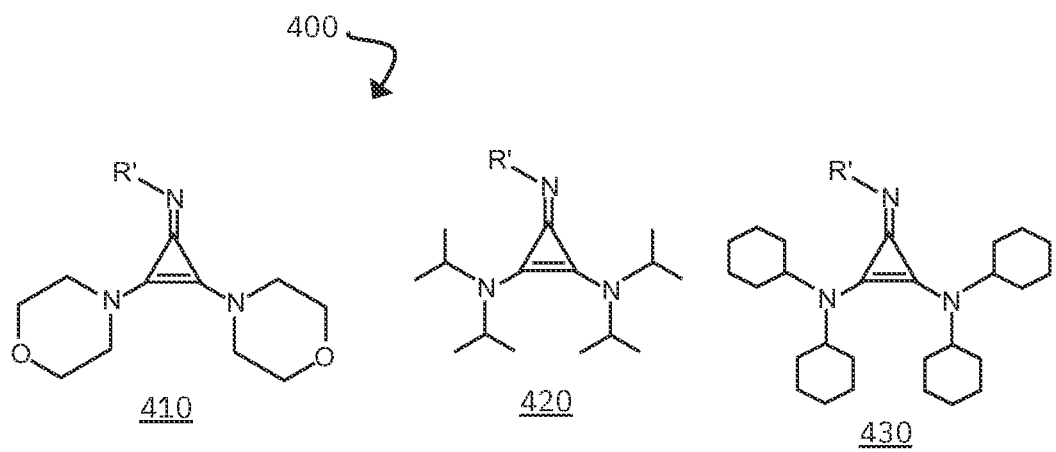
FIG. 4A is a chemical structure diagram illustrating CPIs with a series of R groups, according to some embodiments.

FIG. 4A is a chemical structure diagram illustrating CPIs 400 with a series of R groups, according to some embodiments. The R groups can be modified to tune solubility, basicity, stability, etc. For example, CPI 410, which has morpholino R groups, may be more soluble than CPI 420 and CPI 430, which respectively have isopropyl and cyclohexyl R groups. Further, the R groups may be modified to induce twisting of the plane between the cyclopropene ring and the —NR$_2$ moieties due to steric interactions. This may impact the basicity and reactivity of the CPIs. The R' group of CPIs 410-430 can be any appropriate organic substituent (see, e.g., FIGS. 3 and 4B).

Figure 4B:
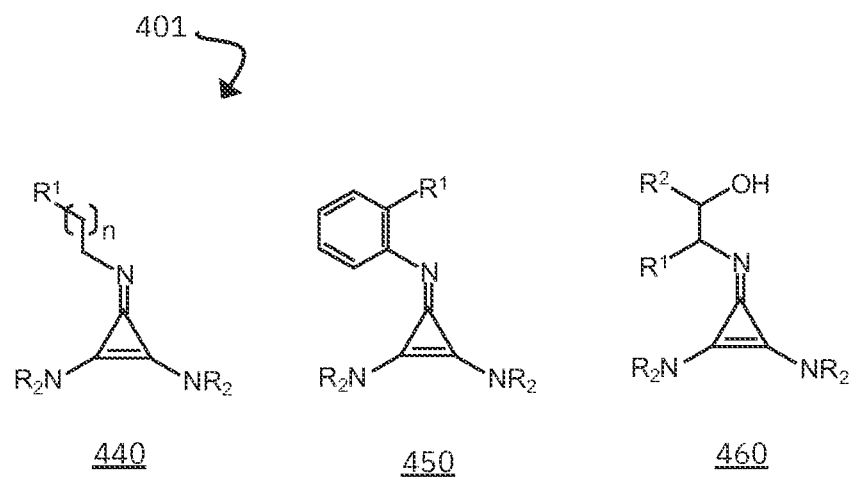
FIG. 4B is a chemical structure diagram illustrating CPIs with a series of R' groups, according to some embodiments.

FIG. 4B is a chemical structure diagram illustrating CPIs 401 with a series of R' groups, according to some embodiments. The R' groups of CPI 440 and CPI 450, respectively, include linear alkyl and cyclic aromatic moieties. The R' group of CPI 460 includes an alcohol moiety. In CPIs 440-460, R$^1$ and R$^2$ can, independently, be hydrogen atoms or any appropriate reactive or unreactive functional groups. The R' groups can be modified to tune interactions with $CO_2$. For example, when R' includes an alcohol moiety (e.g., CPI 460 or CPIs 440/450 when R$^1$ has hydroxyl group), a synergistic effect on $CO_2$ capture analogous to alcohol-containing guanidine and amidine systems may be conferred. The R groups of CPIs 440-470 can be any appropriate organic substituents (see, e.g., FIG. 4A).

Further embodiments can include polymers containing CPI and/or tris[amino]cyclopropenium (TAC) pendant groups. These polymers can be formed using polymerizable building blocks containing pendant CPIs and TAC ions. In other embodiments, CPI and/or TAC pendant groups may be added post-polymerization. A wide variety of polymers may be synthesized with these pendant groups, such as polynorbornenes, polycarbonates, polystyrenes, polymethylmethacrylates, polymethacrylates, polyethers, polyesters, epoxide resins, polyamines, etc.

In some embodiments, CPI-functionalized methacrylate polymers can be formed by reacting amine functionalized methacrylates or methacrylamides with various chloro-CPI precursors to generate an array of methacrylate CPI salts. For example, TAC monomers can be formed using a primary amine R'—NH$_2$ (e.g., primary amine at operation 106 of process 100) where R' includes a methacrylate moiety. TAC monomers may undergo polymerization and copolymerization by a variety of reversible deactivation radical polymerization (RDRP) reactions.

Figure 5:
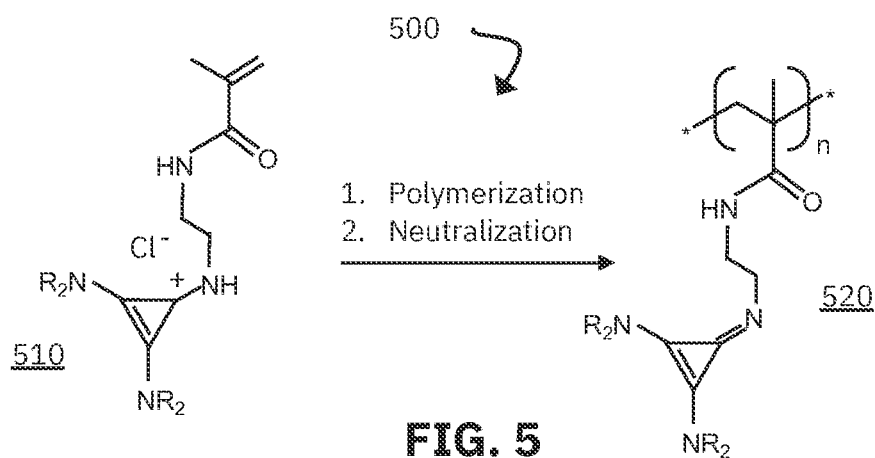
FIG. 5 is a chemical reaction diagram illustrating a process of forming a CPI-functionalized polymethacrylate, according to some embodiments.

FIG. 5 is a chemical reaction diagram illustrating a process 500 of forming a CPI-functionalized polymethacrylate, according to some embodiments. In this example, a TAC monomer 510 is provided. The TAC monomer has a TAC ion moiety and can be formed, for example, in process 100 using 2-aminoethylmethacrylamide. The TAC monomer 510 can be polymerized (e.g., via RDRP) and, following polymerization, neutralized to the free-base CPI. This yields a CPI polymer 520. While FIG. 5 illustrates a homopolymer 520, the TAC monomer 510 can be copolymerized with other monomers, such as methacrylates having various functional groups. This can allow CPI reactivity to be tuned by utilizing the effects of neighboring pendant groups (e.g., hydroxyl groups).

Figure 6:
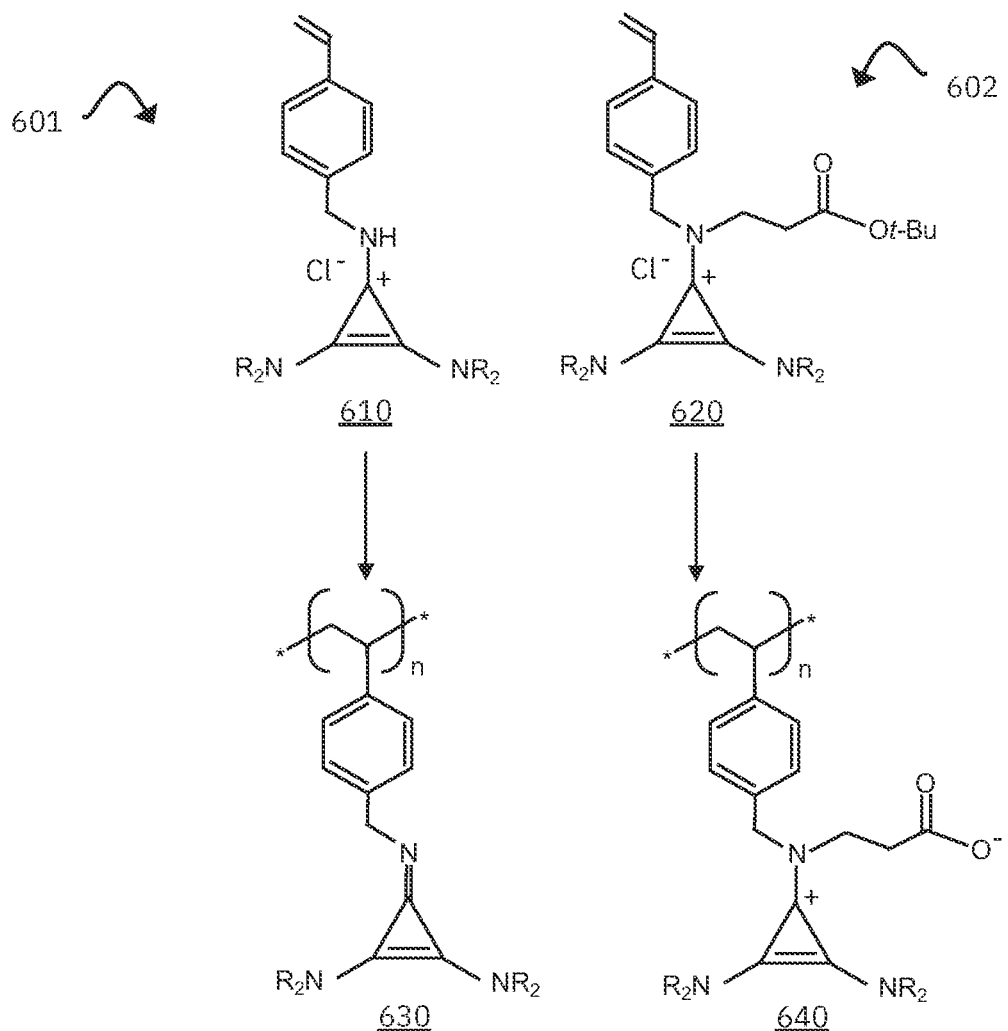
FIG. 6 is a chemical reaction diagram illustrating processes of forming a CPI-functionalized polystyrene, according to some embodiments.

FIG. 6 is a chemical reaction diagram illustrating processes 601 and 602 of forming CPI-functionalized polystyrenes, according to some embodiments. Processes 601 and 602 begin with styrene-TAC monomers 610 and 620, respectively. Polymerization of these monomers affords corresponding cationic TAC-functionalized polystyrenes (not shown), which can be neutralized by basification to yield CPI-functionalized polystyrenes 630 (process 601) and 640 (process 602). In process 602, deprotection of the TAC t-butyl ester results in a zwitterionic polystyrene 640.

In further embodiments, a series of CPI-functionalized styrene monomers may be produced and used to generate solid phase resins that may be incorporated into continuous capture and transformation processes.

Figure 7:
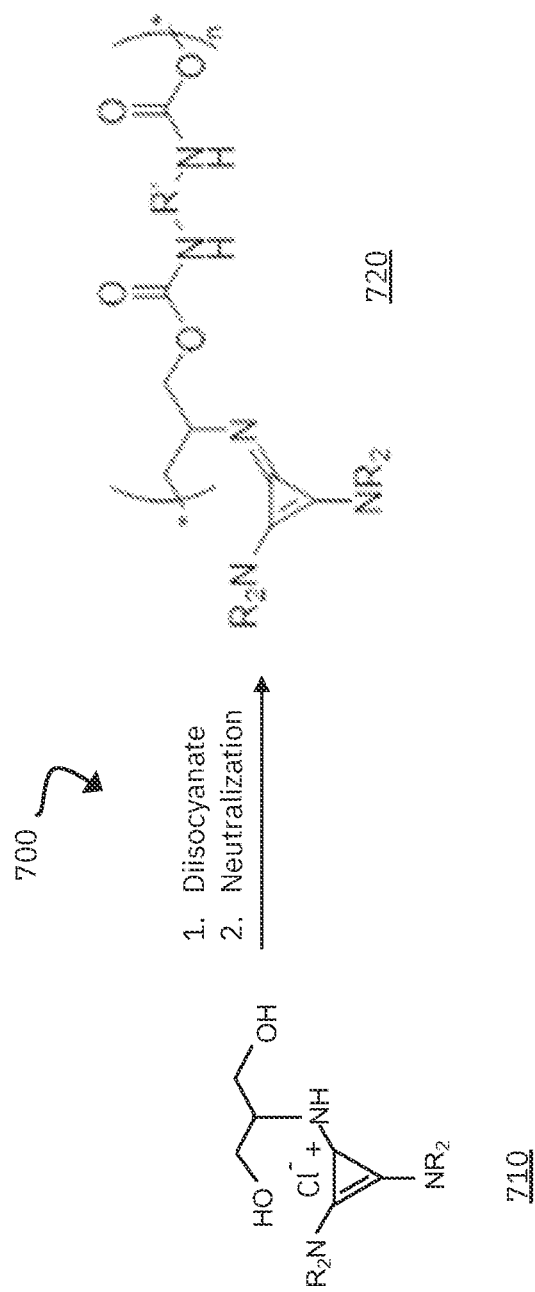
FIG. 7 is a chemical reaction diagram illustrating a process of forming a CPI-functionalized polyurethane, according to some embodiments.

FIG. 7 is a chemical reaction diagram illustrating a process 700 of forming CPI-functionalized polyurethanes, according to some embodiments. In some embodiments, amino-alcohols can be used to form TAC-diol monomers 710 for organocatalyzed polyadditions, providing CPI-functionalized polyurethanes 720 following neutralization. For example, serinol can be reacted with a chloro-CPI to form the TAC-diol monomer 710 illustrated in FIG. 7. Polyaddition with a diisocyanate can afford a corresponding TAC-functionalized polyurethane (not shown). In structure 720, the diisocyanate R' can be any appropriate organic moiety selected independently of the CPI organic groups. Neutralization by addition of a base can result in the illustrated CPI-functionalized polyurethane 720. Polymerizations of TAC-diol monomers can be accomplished as homogeneous solutions, as emulsions or suspensions, or in bulk. In some embodiments, crosslinking agents can be used to form various CPI-functionalized polyurethanes. Using techniques such as these, TAC-diols can be used as building blocks for polymer precipitates, crosslinked polymer beads, or high surface area polymeric foams using conventional synthetic methodologies.

Figure 4B:
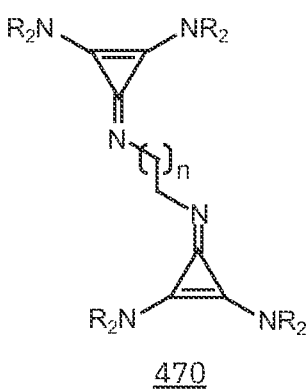
Figure 8A:
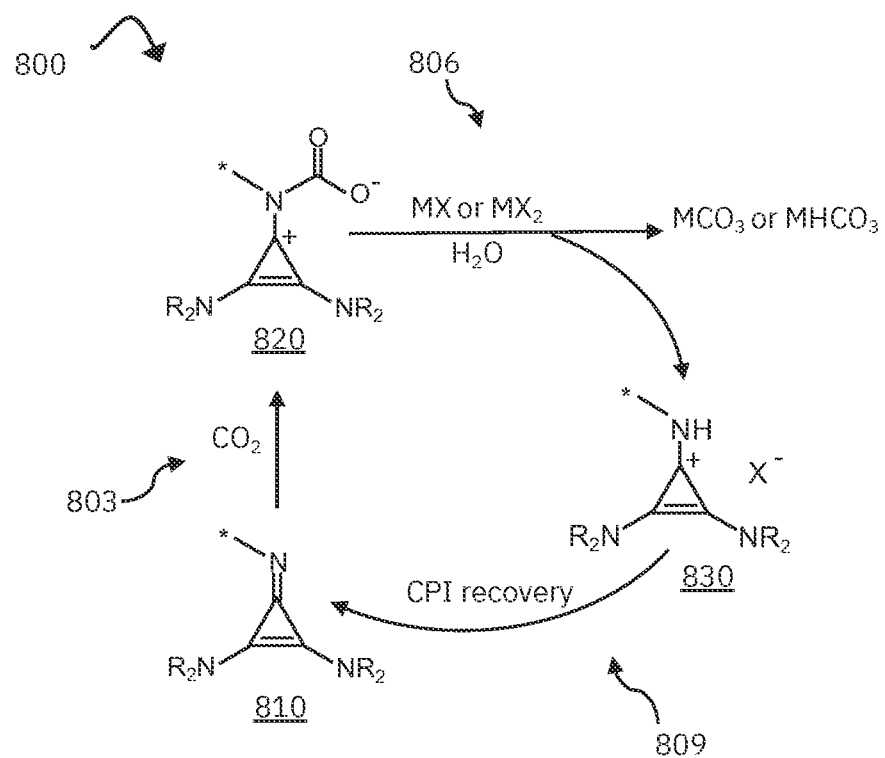
FIGS. 8A and 8B are a chemical reaction diagrams illustrating processes of CPI-facilitated mineralization, according to some embodiments.
Figure 8B:
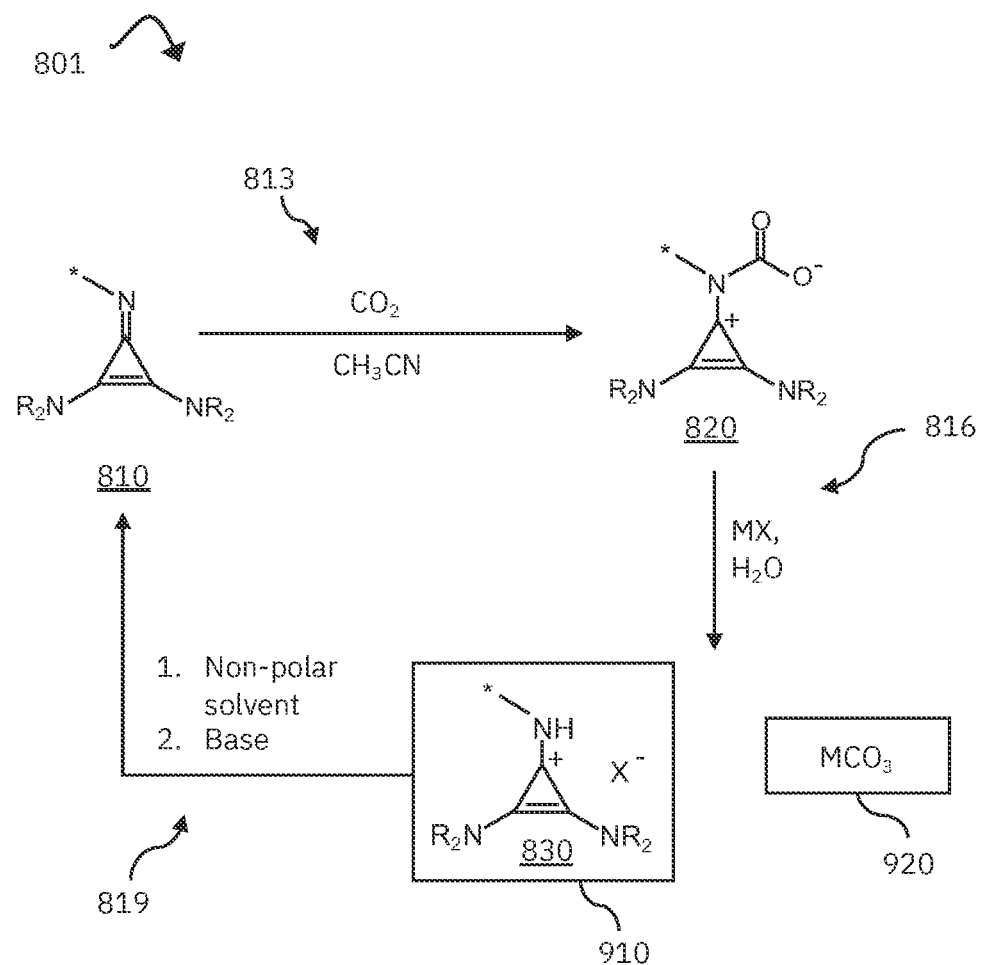

FIGS. 8A and 8B are a chemical reaction diagrams illustrating processes 800 and 801 of CPI-facilitated mineralization, according to some embodiments. Processes 800 and 801 may be used to utilize and/or store captured $CO_2$. For example, large scale processes may be used for DAC, $CO_2$ storage, and/or conversion of $CO_2$ into more useful chemical species. In FIGS. 8A and 8B, CPI 810 is illustrated with a starred bond, which can be a covalent bond, e.g., to a carbon atom of R' (see, e.g., FIGS. 3-4B), a metal complex, a polymer/oligomer repeat unit (see, e.g., FIGS. 5-7), etc. In some embodiments, at least one R group may be replaced by a bond to a metal complex or polymer repeat unit as well.

Process 800 (FIG. 8A) includes mineralization of $CO_2$. Various examples of CPIs 810 can be used in mineralization reactions such as process 800, including small molecules, oligomers, polymers, etc. In these mineralization processes, CPI and $CO_2$ act as a carbonate source that can react with metal cations (e.g., from salts dissolved in water) to form carbonate minerals (or "metal carbonates"). In each of processes CPI 810 is reacted with gaseous $CO_2$ to form a $CPI-CO_2$ adduct 820. This is illustrated at operation 803. The $CO_2$ can come from direct sources such as substantially pure $CO_2$ (e.g., ~100% $CO_2$), $CO_2$/inert gas mixtures (e.g., ~20-99% $CO_2$), etc. or dilute sources such as atmospheric gas (e.g., ~0.04% $CO_2$), exhaled air (e.g., ~4% $CO_2$), etc. In the illustrated examples, CPI 810 can be suspended in a polar organic solvent such as acetonitrile. However, CPI 810 may be suspended in different solvents/liquids, polymer networks, solid supports, etc. In further embodiments, CPI 810 can be provided in a solvent-free environment. This is discussed in greater detail below.

At operation 806, the adduct 820 can be mixed with an aqueous solution containing mono- and/or divalent metal cations ($M^{n+}$, where n indicates the oxidation state of the metal M). The cations can be provided as a salt MX or $MX_2$, such a metal halide (e.g., where $X^-$ is chloride and $M^{n+}$ is $Na^+$, $K^+$, $Mg^{2+}$, $Ca^{2+}$, or $Sr^{2+}$). This results in formation of a CPI conjugate acid halide salt $CPI-H^+/X^-$ and a bicarbonate $MHCO_3$ when the metal is monovalent or a carbonate $MCO_3$ when the metal is divalent. The solid metal carbonate (or bicarbonate) can be removed from the mixture by filtration. At operation 809, $CPI-H^+$ can be converted back to the free-base CPI 810 by basification (e.g., addition of an aqueous alkaline solution). The recovered CPI 810 can be isolated as a solid and/or reacted with additional $CO_2$ (returning to operation 803). Examples of techniques for CPI recovery are discussed in greater detail below.

In some embodiments, operation 806 can include mixing the $CPI-CO_2$ adduct 820 with brine (aqueous NaCl) in a "Solvay" process. This can result in formation of soluble $CPI-H+/Cl^-$ (830, where $X^-=Cl^-$) and solid sodium bicarbonate ($NaHCO_3$). The sodium bicarbonate can then be filtered and dried, and the CPI 810 can be recovered from the remaining solution by addition of a base (e.g., an ammonium hydroxide or sodium hydroxide solution) to the $CH_3CN$ solution at operation 809.

An experimental example according to process 800 was carried out with a CPI (e.g., CPI 810, where R=cyclohexyl and the starred bond is to n-butyl) suspended in $CH_3CN$. Gaseous $CO_2$ was added to the CPI suspension from a dilute source, exhaled air (human breath), which contains ~4% $CO_2$ and ~6% $H_2O$ (operation 803). The resulting $CH_3CN$-soluble species was mixed with brine (aqueous NaCl), resulting in a mixture of $CPI-H^+/Cl^-$ and $NaHCO_3$ (operation 806). The $NaHCO_3$ was filtered and dried, and the $CPI-H^+/Cl^-$ was worked-up with ammonium hydroxide to provide the free-base CPI (operation 809). This recovered CPI was isolated as a solid.

FIG. 8B is a chemical reaction diagram illustrating a process 801 of CPI-facilitated $CO_2$ mineralization and biphasic CPI recovery, according to some embodiments. At operation 813, CPI 810 can be reacted with $CO_2$ using substantially the same techniques as at operation 803 (FIG. 8A). The reaction with $CO_2$ forms a soluble $CPI-H^+/HCO_3^-$ salt. Subsequent addition of aqueous $MX_2$ (e.g., $MgCl_2$, $CaCl_2$, or $SrCl_2$) leads to formation of a metal carbonate $MCO_3$ (e.g., $MgCO_3$, $CaCO_3$, or $SrCO_3$) and $CPI-H^+/X^-$ salt at operation 816. The reaction at operation 816 forms an organic phase 910 (soluble $CPI-H^+/X^-$ salt 830) and an aqueous phase 920 (insoluble $MCO_3$). In some embodiments, other examples of metal halide salts (MX or $MX_2$) may be used in process 801. For example, $NaCl_{(aq)}$ can be reacted to form an aqueous phase 920 with $NaHCO_3$/$Na_2CO_3$ ($M_2CO_3$) under substantially the same conditions.

The $MCO_3$ (or $M_2CO_3$) precipitate can be removed via filtration and drying of the aqueous phase 920. CPI 810 can be substantially recovered from the organic phase 910 at operation 819. In some embodiments, addition of an aqueous base such as NaOH or $NaNH_4$ (e.g., about 1 M) to the $CPI-H^+/X^-$ salt solution 910 can regenerate CPI 810. However, in other embodiments operation 819 may be carried out under milder conditions using a biphasic process. In these instances, the $CPI-H^+/X^-$ salt solution 910 can undergo solvent exchange from the polar organic solvent ($CH_3CN$) into a non-polar solvent (e.g., toluene, hexanes, combinations thereof, etc.). Addition of an aqueous alkaline solution, such as about 1 mole/liter (M) $Na_2CO_{3(aq)}$ or about 20-30 vol % $NH_4OH_{(aq)}$ (e.g., about 25%) can then regenerate the CPI moieties (CPI 810). Experimental examples of process 801, using either dilute or direct $CO_2$ sources, yielded at least 90-95% $MCO_3$ and at least 90-95% recovered CPI 810 at operation 819 (see below). The recovered CPI can be used for additional $CO_2$ capture and activation. In some embodiments, CPI recovery processes such as those discussed above can be carried out after one or more $CO_2$ capture/activation cycles, thereby allowing reuse of CPI over multiple cycles.

In some embodiments, the CPI-facilitated $CO_2$ capture/activation processes use seawater as the source of $MX_2$ at operation 806 (FIG. 8A) or 816 (FIG. 8B). Seawater is a mixture of about 96.5% water, 2.5% salts, and small amounts of other substances such as dissolved inorganic and organic materials, particulates, and atmospheric gases. The salts found in seawater can include salts of metal ions $M^{n+}$ such as $Mg^{2+}$, $Ca^{2+}$, $Sr^{2+}$, and $Na^+$ in varying concentrations. The relative concentrations of different $M^{n+}$ ions, pH, and other features of seawater can differ by region. Some of these variations may affect the mineralization products, as will be understood by those of ordinary skill in the art. In experimental examples of process 801 using seawater collected from the Atlantic Ocean near the United States coastline, operation 819 yielded at least 90-95% $MCO_3$ and at least 90-95% recovered CPI 810.

A first experimental example of $CO_2$/seawater mineralization was carried out according to process 801 using a CPI where R=cyclohexyl and the starred bond was to n-butyl (R'). At operation 813, 150 mg CPI was suspended as a powder in $CH_3CN$, and air containing $CO_2$ was fed into the reaction mixture from a balloon inflated by exhaled air, which is a dilute source of $CO_2$ and water (~4% $CO_2$ and ~6% $H_2O$). The resulting formation of the soluble $CPI-H^+/HCO_3^-$ salt occurred within about 10-20 minutes of adding the exhaled air. Seawater was then added to the reaction mixture at operation 816. The seawater was collected from Island Beach State Park, New Jersey.

The addition of the seawater resulted in formation of $CaCO_3$, $MgCO_3$, and $SrCO_3$ precipitate (13 mg, ~95% yield $MCO_3$) which was removed via filtration and drying of the aqueous phase. The organic phase solution of $CPI-H^+/X^-$ salt was then concentrated by solvent evaporation. Toluene and approximately 1 M $Na_2CO_3$(aq) were added to the concentrated organic phase solution in order to recover the CPI at operation 819. The recovery yielded 144 mg CPI (~96% recovery).

A second experimental example of CO$_2$/seawater mineralization was carried out on a larger scale according to process 801 using a CPI where R=cyclohexyl and the starred bond was to n-butyl (R'). At operation 813, 1.20 g CPI was suspended as a powder in CH$_3$CN, and gaseous CO$_2$ was fed into the reaction mixture. The resulting formation of the soluble CPI-H$^{30}$/HCO$_3^-$ salt was observed within about 10-20 minutes of adding the exhaled air. Seawater from Island Beach State Park, NJ, was then added to the reaction mixture (operation 816).

The addition of seawater resulted in formation of 105 mg MCO$_3$ (CaCO$_3$, MgCO$_3$, and SrCO$_3$) precipitate (~90% yield), which was removed by filtration and drying of the aqueous phase. The organic phase solution of CPI-H$^+$/X$^-$ salt was then concentrated by solvent evaporation. Toluene and approximately 1 M Na$_2$CO$_{3(aq)}$ were then added to the organic phase solution in order to recover the CPI (operation 819). This biphasic recovery yielded 1.16 g CPI (~97% recovery).

A third experimental example of CO$_2$/seawater mineralization was carried out according to process 801 using the following polynorbornene CPI:

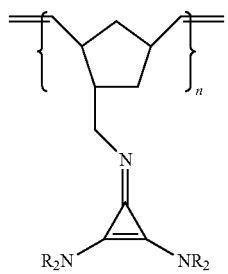

where n is an integer greater than 1 and R=cyclohexyl. At operation 813, 100 mg polynorbornene CPI was added to CH$_3$CN, and about 101 Pa (1 atm) CO$_2$ was fed into the reaction mixture. The reaction with CO$_2$ resulted in formation of soluble polynorbornene with pendant CPI-H$^+$/HCO$_3^-$ groups. Seawater from Island Beach State Park, NJ, was then added to the reaction mixture.

The addition of seawater (operation 816) resulted in formation of MCO$_3$ (CaCO$_3$, MgCO$_3$, and SrCO$_3$) precipitate (11 mg, ~95% yield) which was removed via filtration and drying of the aqueous phase. The organic phase was then concentrated and combined with toluene and approximately 1 M Na$_2$CO$_{3(aq)}$ in order to recover the polynorbornene CPI (97% polynorbornene CPI recovery) at operation 819.

Figure 9A:
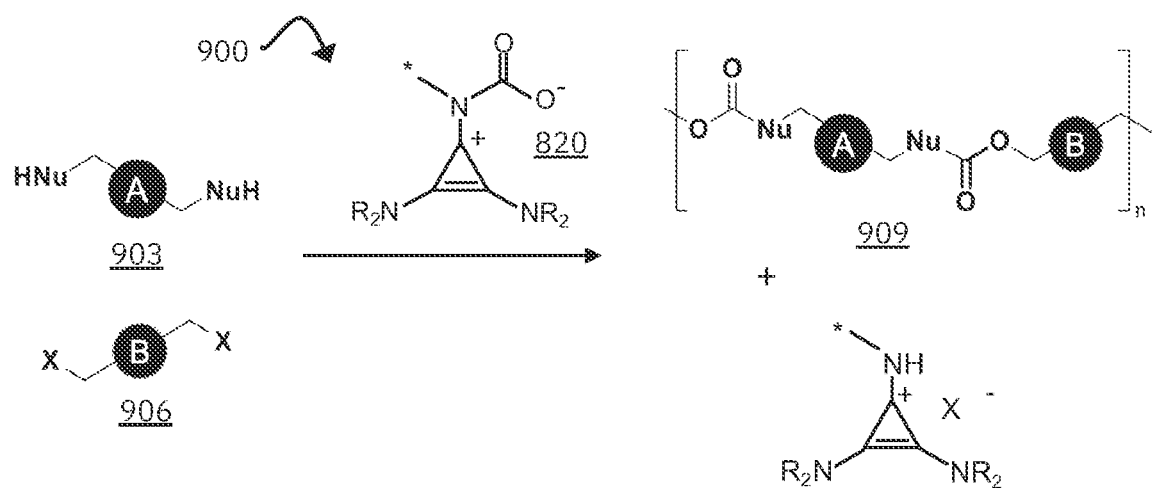
FIGS. 9A and 9B are chemical reaction diagrams illustrating generic processes of CPI-facilitated polymerization, according to some embodiments.
Figure 9B:
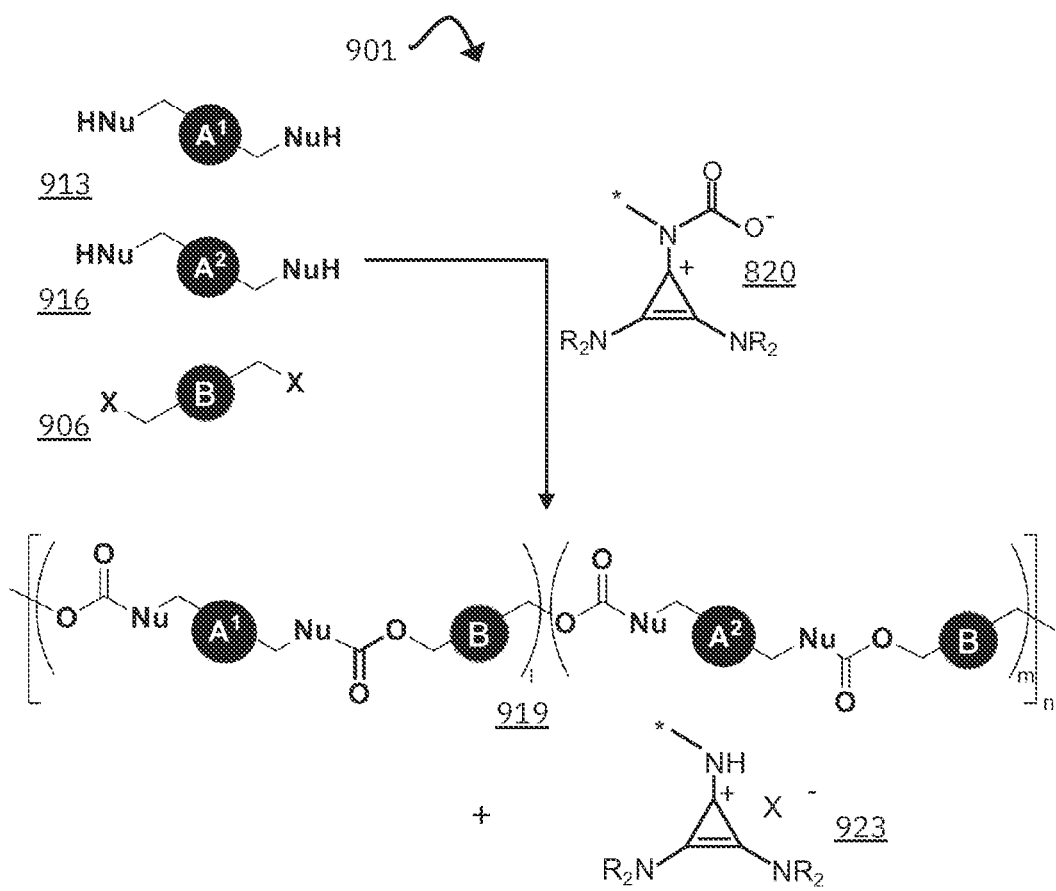

FIGS. 9A and 9B are chemical reaction diagrams illustrating generic processes 900 and 901 of CPI-facilitated polymerization, according to some embodiments. Processes 900 and 901 may be used to utilize and/or store captured CO$_2$. For example, large scale processes may be used for DAC, CO$_2$ storage, and/or conversion of CO$_2$ into useful polymers. In FIGS. 9A and 9B, the reaction between CPI 810 and CO$_2$ to form the adduct 820 is not shown. However, the adduct can be formed using substantially the same techniques as operation 803 or 813 (FIGS. 8A and 8B), e.g., by adding CO$_2$ to a suspension of CPI 810 in acetonitrile to form the soluble adduct 820. Like in FIGS. 8A and 8B, the CPI adduct 820 is illustrated with a starred bond, which can be a covalent bond, e.g., to a carbon atom of R' (see, e.g., FIGS. 3-4B), a metal complex, a polymer/oligomer repeat unit (see, e.g., FIGS. 5-7), etc. In some embodiments, at least one R group may be replaced by a bond to a metal complex or polymer repeat unit as well.

In process 900 (FIG. 9A), the CPI-CO$_2$ adduct 820 may act as a stoichiometric source of CO$_2$ to form a polycarbonate or a polyurethane. In some embodiments, compound 903 is a diol or diamine. Herein, the abbreviation "Nu" on compound 903 represents a nucleophile, such as —O—, —N(H)—, or —N(R$^1$)—, where R$^1$=an organic substituent. That is, compound 903 can be a diol (when —NuH is a hydroxyl group (—OH)) or a diamine (when —NuH is a primary or secondary amine (respectively, —NH$_2$ or —NHR$^1$)). The portion of compound 903 represented by a circle labeled "A" in FIG. 9A can be, e.g., a cyclic or acyclic organic group (see, e.g., FIGS. 11A, 11B, and 13).

Figure 9C:
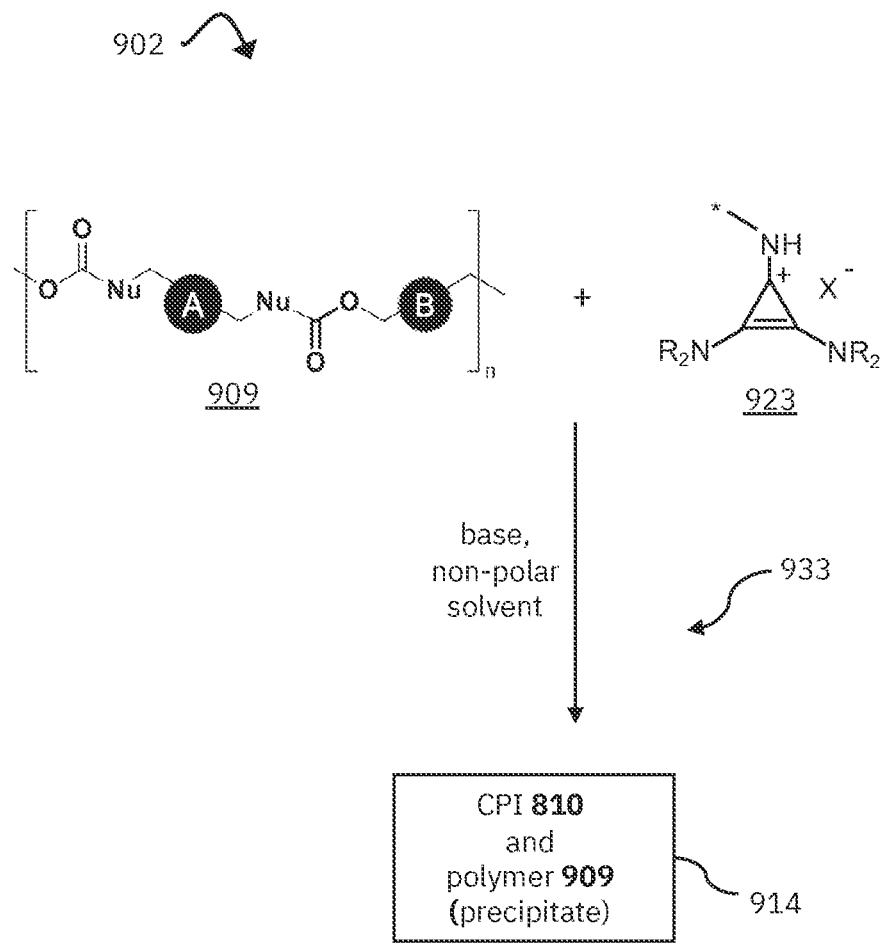
FIG. 9C is a chemical reaction diagram illustrating a process of CPI recovery, according to some embodiments.

In some embodiments, compound 906 is an aryl halide or aryl sulfonate. On compound 906, X represents a leaving group, such as a halide or sulfonate (e.g., where X$^-$=chloride, bromide, iodide, mesylate (OMs), tosylate (OTs), etc.). In various embodiments, the portion of compound 906 represented by a circle labeled "B" in FIG. 9A can be any appropriate aromatic group (see e.g., FIG. 10). When compound 903 is a diol, the product of process 900 can be a polycarbonate 909. When compound 903 is a diamine, the product of process 900 can be a polyurethane 909. Process 900 also results in formation of a CPI conjugate acid salt (CPI-H$^+$/X$^-$) 923 where X$^-$ corresponds to the leaving group 906. The polymer 909 can then be obtained/purified, and CPI 810 can be recovered from CPI-H$^±$/X$^-$ 923. This is illustrated in FIG. 9C. Process 900 may be repeated at least once using the recovered CPI.

Process 901 (FIG. 9B) is an example polymerization substantially similar to process 900, except that three monomer species (generic compounds 913, 916, and 906) are used to form a polyurethane or polycarbonate (polymer 919). The portions of compounds 913 and 916 respectively represented by circles labeled "A$^1$" and "A$^2$" in FIG. 9B can be independently selected from organic groups such as the cyclic or acyclic organic groups discussed with respect to compound 906. In further embodiments (not shown), there can be more than one or two monomer species with nucleophile groups and/or more than one monomer species with leaving groups in process 901, as will be understood by persons of ordinary skill in the art. Process 901 also results in formation of CPI-H$^+$/X$^-$ 923. The polymer 919 can then be obtained/purified, and CPI 810 can be recovered from CPI-H$^+$/X$^-$ 923. This is illustrated in FIG. 9C. Process 901 may be repeated at least once using the recovered CPI.

FIG. 9C is a chemical reaction diagram illustrating a process 902 of CPI recovery 900 after a CPI-facilitated polymerization (e.g., process 900 or 901), according to some embodiments. FIG. 9C illustrates recovery of CPI 810 from the conjugate acid salt 923 and purification of polymer 909 (FIG. 9A) from the products of operation 900. However, process 902 can also be used to obtain CPI 810 and polymer 919 after process 901 (FIG. 9B) in various embodiments. Process 902 can be a biphasic recovery process, which may be similar to that of processes discussed in greater detail above with respect to FIGS. 2 and 8B (basification of CPI-H$^+$).

In process 902, a mixture (e.g., a CH$_3$CN solution) of CPI/H$^+$/X$^-$ 923 and polymer 909 can be combined with an aqueous alkaline solution (e.g., about 1 M Na$_2$CO$_{3(aq)}$ or about 20-30 vol % NH$_4$OH$_{(aq)}$) and a non-polar solvent (e.g., toluene, hexanes, or a combination thereof). The resulting organic phase 914 can be separated from an aqueous phase (not shown) containing X$^-$ salt (e.g., NaX) and other water soluble reaction components (e.g., Na$_2$CO$_3$, and NaHCO₃). The organic phase 914 can include CPI 810 (soluble) and polymer 909 (insoluble). The polymer 909 precipitate can be obtained (e.g., filtered, purified, etc.) from the organic phase 914 using techniques known to those of ordinary skill in the art (not shown). The CPI 810 can be recovered from the remaining organic solution and optionally reused for additional $CO_2$ capture (e.g., process 200 illustrated in FIG. 2). In some embodiments, CPI recovery processes such as those discussed above can be carried out after one or more $CO_2$ capture/activation cycles, thereby allowing reuse of CPI over multiple polymerization cycles.

Figure 10:
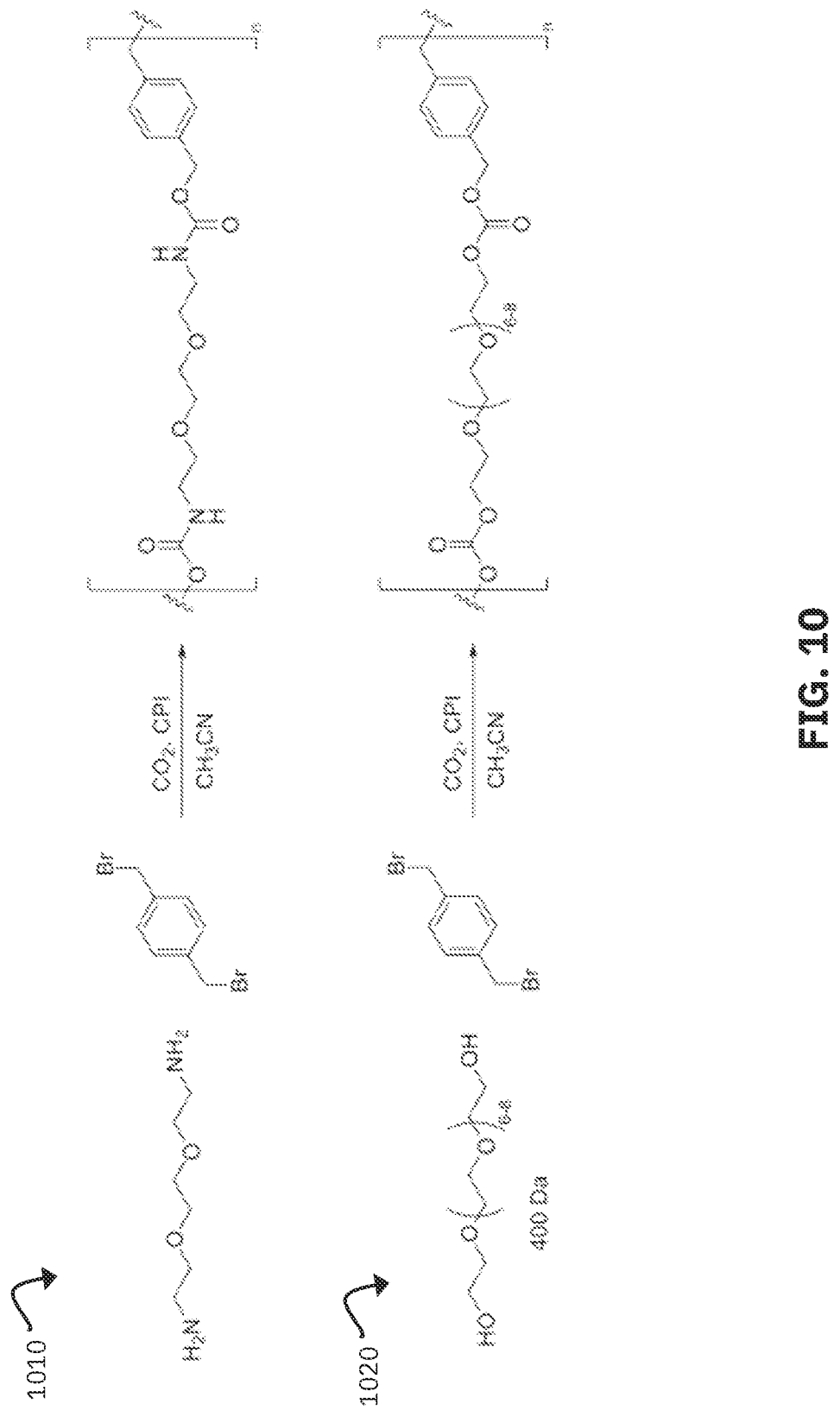
FIG. 10 is a chemical reaction diagram illustrating example processes of CPI-facilitated polymerization, according to some embodiments.

FIG. 10 is a chemical reaction diagram illustrating example processes 1010 and 1020 of CPI-facilitated polymerization, according to some embodiments. Processes 1010 and 1020 may be carried out according to generic process 900 in some embodiments. In process 1010, the CPI-$CO_2$ adduct 820 reacts with 1,8-diamino-3,6-dioxaoctane (amino-PEG2-amine) and 1,4-bis(bromomethyl)benzene in acetonitrile to form polyurethane (where n is an integer greater than 1). In process 1020, the CPI-$CO_2$ adduct reacts with ~400 Da polyethylene glycol and 1,4-bis(bromomethyl)benzene in acetonitrile to form polycarbonate (where n is an integer greater than 1). As discussed above, CPI 810 (not shown in FIG. 10) can be recovered and reused after a first polymerization cycle 1010 or 1020.

Figure 11A:
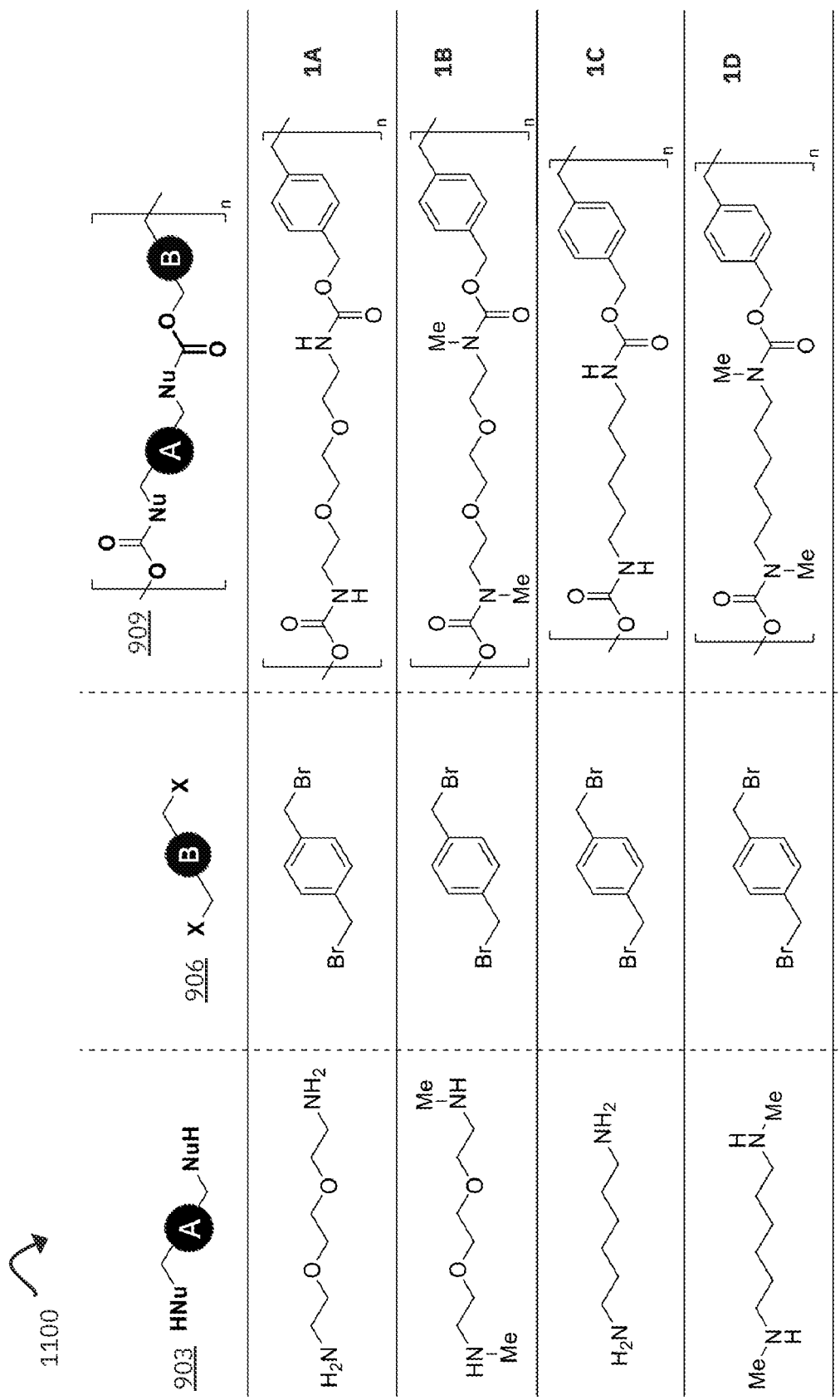
FIGS. 11A and 11B are tables illustrating chemical structures corresponding to experimental examples of CPI-facilitated polymerizations, according to some embodiments.
Figure 11B:
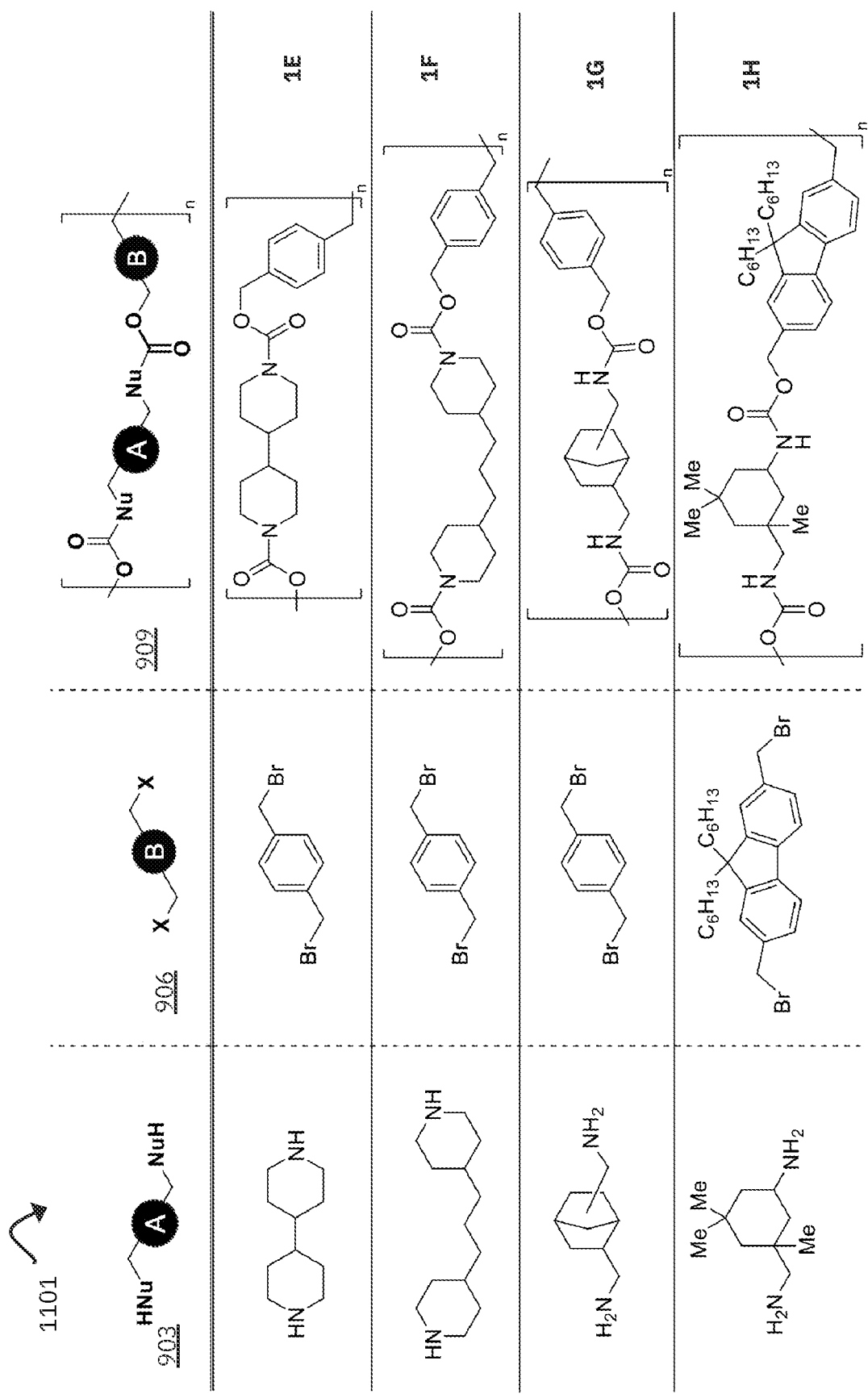

FIGS. 11A and 11B are tables 1100 and 1101 illustrating chemical structures corresponding to experimental examples of CPI-facilitated polymerizations. Tables 1100 and 1101 show examples of monomers (compounds 903 and 906) used in experimental examples carried out using techniques substantially similar to those of process 900, as well as the resulting polymers 1A-1H (polymer 909) formed in the examples.

FIG. 12 is a table 1200 illustrating experimental data characterizing the polymers 1A-1H illustrated in FIGS. 11A and 11B. The values shown in table 1200 (mean molecular weight, dispersity, decomposition temperature, and glass transition temperature) were experimentally obtained for each polymer 1A-1H using known techniques.

Figures 13, 14:
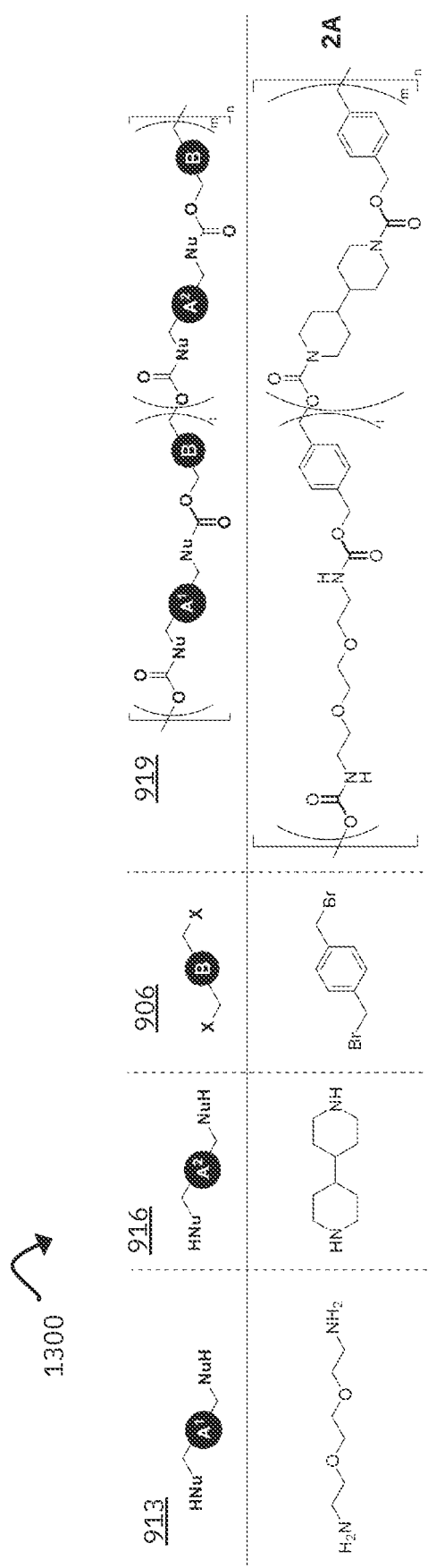
FIG. 13 is a table illustrating chemical structures corresponding to an experimental example of CPI-facilitated polymerization, according to some embodiments.
FIG. 14 is a table illustrating experimental data characterizing a polymer illustrated in FIG. 13.

FIG. 13 is a table 1300 illustrating chemical structures corresponding to an experimental example of CPI-facilitated polymerization, according to some embodiments. Table 1300 shows monomers (corresponding to compounds 913, 916, and 906) reacted with activated $CO_2$ in an experimental example carried out using techniques substantially similar to those of process 901, as well as the resulting polymer 2A (polymer 919) formed in the reaction.

FIG. 14 is a table illustrating experimental data characterizing a polymer product formed in the experimental example of FIG. 13, according to some embodiments. The values shown in table 1400 (mean molecular weight, dispersity, decomposition temperature, and glass transition temperature) were experimentally obtained for polymer 2A using techniques known to those of ordinary skill in the art.

A wide variety of CPI-containing materials ("CPI materials") can be formed based on CPI small molecules (see, e.g., FIGS. 3-4B), polymers with CPI pendant groups (see, e.g., FIGS. 5-7), other polymers and polymer networks (see below), etc. These CPI materials can include CPI moieties having the following structure:

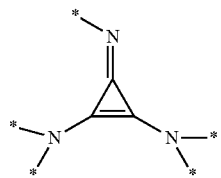 [SMILES: *N=c1c(N(*)*)c1N(*)*]

where each starred bond can be a covalent bond to, e.g., a carbon atom of an organic moiety (R) or a polymer repeat unit, as discussed in greater detail above. The CPI moieties can allow the materials to be used for $CO_2$ capture/activation technologies on a variety of scales. These CPI materials may be recovered after one or more $CO_2$ capture/activation processes using, for example, a biphasic recovery process (e.g., operation 819 of process 801, illustrated in FIG. 8B).

In some embodiments, the polymers can be multi-functional polymers for capturing $CO_2$ and transforming the $CO_2$ into new chemicals (e.g., metal carbonates). Copolymerization of the building blocks (e.g., monomers or oligomers) with other functional monomers can be used to tune both $CO_2$ uptake and processability of the final polymers. Various macromolecular architectural considerations may also be used for tuning these properties. Examples of polymer architectures may include linear, branched, dendritic, bottle brush, surface-grafted, etc. Techniques for automated polymerization, high-throughput characterization, predictive modeling, etc. may be employed to facilitate selection of material compositions. Through selection of monomers/oligomers used in these processes, both homogeneous and segmented morphologies can be generated, allowing control over air permeation, modulus, hydrophilic/hydrophobic balance, and other key structural features.

In some embodiments, CPI polymers can be processed in modular architectures such as particles, suspensions, membranes, fibers, gels, coatings, etc. These CPI materials can be formed by polymerization of CPIs and/or TAC ion derivatives (see above). CPI and/or TAC molecules may also be used to functionalize polymeric materials such as particles, suspensions, membranes, fibers or other solid materials, gels, coatings, etc. in some embodiments. For example, nano- or microparticles can be formed from polymers with CPI/TAC pendant groups and/or surface-functionalized with CPI molecules. CPI surfactants may be used as coatings as well. In some embodiments, a CPI-fiber material can be formed by polymerizing or copolymerizing CPI monomers, functionalizing a polymer fiber with CPIs, crosslinking a polymer fiber with CPIs, coating a fibrous material (e.g., woven or knit fabrics, paper or cloth filters, filler/insulation materials, etc.) with a CPI small-molecule, oligomer, or polymer coating, or any other techniques for incorporating molecules such as CPIs into fibrous materials.

The CPI materials can be used in DAC technologies to sequester and upcycle (e.g., activate or release in response to a stimulus) $CO_2$. For example, the CPI materials may be exposed to gaseous $CO_2$ in a solvent or solvent-free environment. In examples involving CPI-$CO_2$ adducts formed in a solvent-free environment, activation of the $CO_2$ and recovery of the CPI may be carried out in appropriate solvents, and the recovered CPI can optionally be dried and reused for $CO_2$ capture in the solvent-free environment. The CPI-facilitated $CO_2$ capture and activation can allow the CPI materials to facilitate mineralization or polymerization reactions such as those discussed above. The reaction products (e.g., aqueous phase metal carbonates and organic phase CPI-H$^+$/Cl$^-$ conjugate acid) can then be separated, and the CPI materials can be recovered for additional CO$_2$ capture/activation. For example, a biphasic process with the conjugate acid material (see, e.g., FIG. 8B) can be used to recover the CPI material.

The formation of CPI-CO$_2$ adducts and subsequent recovery of CPI involves transformation from a polar zwitterionic form (adduct) to a non-polar neutral free-base form (CPI). This chemical change may be used to drive macromolecular phase transformations reversibly induced by CO$_2$ capture followed by activation or release. For example, phase transitions of ABA triblock copolymers having hydrophobic A-blocks derived from CPI and a center B-block derived from hydrophilic polymers may be used. These triblock copolymers can be prepared from difunctional hydrophilic blocks. In some embodiments, the R-groups on CPI can be used to drive phase changes. For example, morpholine-substituted CPIs are likely to be hydrophilic, and may therefore be used as the mid-block in order to increase the number of CO$_2$ capture sites within the entire triblock.

For example, a sol-gel CO$_2$ capture/release process (not shown) can be carried out using the aforementioned triblock copolymer with CPI pendant groups. The frustrated outer hydrophobic blocks fold back to form a hydrophobic pocket or "flower-like" micelle. Above ~3-5% concentration in an aqueous solution, mild agitation can cause the hydrophobic chains to interdigitate, thereby connecting the micelles and producing a hydrogel. CO$_2$ capture by passing air through the gel can cause a phase-change from a gel to a sol. This is because the CPI-CO$_2$ adduct is hydrophilic and its formation causes unfolding of the micelles. The sol copolymer can be captured and converted back to the gel upon release of the CO$_2$.

Various types of apparatus may be used in mediating absorption for DAC. For example, polymeric CPI materials for CO$_2$ capture/transfer (e.g., for mineralization or polymerization) may be employed in a packed bead reactor, trayed adsorption column, spray tower, spray dryer, etc. (see below). Techniques for gas-liquid mass transfer known to those of ordinary skill may be employed, and parameters such as flow rates, temperatures, concentrations, residence times, packing or tray types, nozzle design, droplet size (in spray methods) can be tuned.

In a packed bead reactor, there can be an absorption column that uses polymeric micro- and/or nanoparticles as a CPI-functionalized solid support resin. The absorption column can be packed with CPI-functionalized particles, and a CO$_2$-containing gas phase (e.g., atmospheric gas) can be passed through the column until CO$_2$ breakthrough is observed. Following the CO$_2$ exposure, the column can be detached, regenerated, and the gas released using techniques such as those discussed above (e.g., by photoredox/irradiation, mechanical force such as sonication, etc.). In some embodiments, CPI-functionalized particles can be formed using CPI-styrene monomers behaving as surfactants. In these instances, polymerization with a core derived from a hydrophobic styrene and various concentrations of divinylbenzene (DVB), can generate highly crosslinked particles by mini-emulsion polymerization.

In a trayed absorption column, a CO$_2$-containing gas can be continually introduced at the bottom of the column while a CO$_2$-absorbing liquid, which includes a CPI-functionalized small-molecule or polymer, is introduced at the top of the column. As the gas and liquid phases mix in the column, the gas can percolate on trays positioned in the column to allow sufficient residence time for gas absorption into the liquid phase. The scrubbed gas can then be collected at the top of the column, and the CPI-CO$_2$-containing liquid can be collected at the bottom of the column for further downstream processing (e.g., including upcycling/mineralization and/or release of the captured CO$_2$).

A spray tower can utilize an aqueous solution or emulsion of a CPI-functionalized polymer or CPI small molecules. This CPI-containing liquid can be sprayed from the top of the tower into a CO$_2$-containing gas. As in the trayed absorption column, the solution containing the captured CO$_2$ (CPI-CO$_2$ adducts) can then be collected at the bottom for further downstream processing.

A spray dryer can be similar to the spray tower. For example, a controlled mist of the CPI-containing liquid can be introduced into a tower or column concurrently with CO$_2$-containing air (e.g., heated CO$_2$-containing air). In this configuration, the liquid can be heated to ensure complete evaporation of the liquid phase and produce a solid aerosol and "wet" air. A cyclone separator can be used to disengage the solid material (the small-molecule or polymeric CPI—CO$_2$ adduct) from the flowing air.

Various embodiments of the present disclosure are described herein with reference to the related drawings, where like numbers refer to the same component. Alternative embodiments can be devised without departing from the scope of the present disclosure. It is noted that various connections and positional relationships (e.g., over, below, adjacent, etc.) are set forth between elements in the following description and in the drawings. These connections and/or positional relationships, unless specified otherwise, can be direct or indirect, and the present disclosure is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus. Further, the word "providing" as used herein can refer to various actions such as creating, purchasing, obtaining, synthesizing, making available, etc. or combinations thereof.

As used herein, the articles "a" and "an" preceding an element or component are intended to be nonrestrictive regarding the number of instances (i.e., occurrences) of the element or component. Therefore, "a" or "an" should be read to include one or at least one, and the singular word form of the element or component also includes the plural unless the number is obviously meant to be singular.

As used herein, the terms "invention" or "present invention" are non-limiting terms and not intended to refer to any single aspect of the particular invention but encompass all possible aspects as described in the specification and the claims.

Unless otherwise noted, ranges (e.g., time, concentration, temperature, etc.) indicated herein include both endpoints and all numbers between the endpoints. Unless specified otherwise, the use of a tilde (~) or terms such as "about," "substantially," "approximately," "slightly less than," and variations thereof are intended to include the degree of error associated with measurement of the particular quantity based upon the equipment available at the time of filing the application. For example, "about" can include a range of ±8% or 5%, or 2% of a given value, range of values, or endpoints of one or more ranges of values. Unless otherwise indicated, the use of terms such as these in connection with a range applies to both ends of the range (e.g., "approximately 1 g-5 g" should be interpreted as "approximately 1 g-approximately 5 g") and, in connection with a list of ranges, applies to each range in the list (e.g., "about 1 g-5 g, 5 g-10 g, etc." should be interpreted as "about 1 g—about 5 g, about 5 g—about 10 g, etc.").

As discussed above, CPIs and other compounds herein include R groups (e.g., R, R', and R', where x is an integer), which can be any appropriate organic substituent known to persons of ordinary skill. In some embodiments, the R groups can include substituted or unsubstituted aliphatic groups. As used herein, the term "aliphatic" encompasses the terms alkyl, alkenyl, and alkynyl.

As used herein, an "alkyl" group refers to a saturated aliphatic hydrocarbon group containing from 1 to 20 (e.g., 2 to 18, 2 to 8, 2 to 6, or 2 to 4) carbon atoms. An alkyl group can be straight, branched, cyclic, or any combination thereof. Examples of alkyl groups include, but are not limited to, methyl, ethyl, propyl, isopropyl, butyl, isobutyl, sec-butyl, tert-butyl, n-pentyl, n-heptyl, or 2-ethylhexyl. An alkyl group can be substituted with one or more substituents or can be multicyclic as set forth below. Unless specified otherwise, the term "alkyl," as well as derivative terms such as "alkoxy" and "thioalkyl," as used herein, include within their scope, straight chain, branched chain, and cyclic moieties.

As used herein, an "alkenyl" group refers to an aliphatic carbon group that contains from 2 to 20 (e.g., 2 to 18, 2 to 8, 2 to 6, or 2 to 4) carbon atoms and at least one double bond. Like an alkyl group, an alkenyl group can be straight, branched, or cyclic, or any combination thereof. Examples of an alkenyl group include, but are not limited to, allyl, isopropenyl, 2-butenyl, and 2-hexenyl. An alkenyl group can be substituted with one or more substituents as set forth below.

As used herein, an "alkynyl" group refers to an aliphatic carbon group that contains from 2 to 20 (e.g., 2 to 18, 2 to 8, 2 to 6, or 2 to 4) carbon atoms and has at least one triple bond. Like an alkyl group, an alkynyl group can be straight, branched, or cyclic, or any combination thereof. Examples of an alkynyl group include, but are not limited to, propargyl and butynyl. An alkynyl group can be substituted with one or more substituents as set forth below.

The term "alkylthio" includes straight-chain alkylthio, branched-chain alkylthio, cycloalkylthio, cyclic alkylthio, heteroatom-unsubstituted alkylthio, heteroatom-substituted alkylthio, heteroatom-unsubstituted $C_n$-alkylthio, and heteroatom-substituted $C_n$-alkylthio. In some embodiments, lower alkylthios are contemplated.

The term "haloalkyl" refers to alkyl groups substituted with from one up to the maximum possible number of halogen atoms. The terms "haloalkoxy" and "halothioalkyl" refer to alkoxy and thioalkyl groups substituted with from one up to five halogen atoms.

As described herein, compounds of the present disclosure can optionally be substituted with one or more substituents, such as are illustrated generally above, or as exemplified by particular classes, subclasses, and species of the present disclosure. Each substituent of a specific group may further be substituted with one to three of, for example, halogen, cyano, sulfonyl, sulfinyl, carbonyl, oxoalkoxy, hydroxy, amino, nitro, aryl, haloalkyl, and alkyl. For instance, an alkyl group can be substituted with alkyl sulfonyl and the alkyl sulfonyl can be optionally substituted with one to three of halogen, cyano, sulfonyl, sulfinyl, carbonyl, oxoalkoxy, hydroxy, amino, nitro, aryl, haloalkyl, and alkyl.

In general, the term "substituted" refers to the replacement of hydrogen radicals in a given structure with the radical of a specified substituent. Specific substituents are described above in the definitions and below in the description of compounds and examples thereof. Unless otherwise indicated, an optionally substituted group can have a substituent at each substitutable position of the group, and when more than one position in any given structure can be substituted with more than one substituent selected from a specified group, the substituent can be either the same or different at every position. A ring substituent, such as a hetero cycloalkyl, can be bound to another ring, such as a cycloalkyl, to form a spiro-bicyclic ring system, e.g., both rings share one common atom. As one of ordinary skill in the art will recognize, combinations of substituents envisioned by this present disclosure are those combinations that result in the formation of stable or chemically feasible compounds.

Modifications or derivatives of the disclosed compounds are contemplated as being useful with the methods and compositions of the present disclosure. Derivatives may be prepared and the properties of such derivatives may be assayed for their desired properties by any method known to those of skill in the art. In certain aspects, "derivative" refers to a chemically modified compound that still retains the desired effects of the compound prior to the chemical modification.

The descriptions of the various embodiments of the present disclosure have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A process of carbon dioxide ($CO_2$) conversion, comprising:
   reacting carbon dioxide ($CO_2$) with a cyclopropenimine (CPI) to activate the $CO_2$;
   transferring the activated $CO_2$ to generate a product of the transferring and a conjugate acid of the CPI; and
   recovering the CPI from the conjugate acid.

2. The process of claim 1, wherein the recovering comprises adding an aqueous base to a solution of the conjugate acid.

3. The process of claim 2, wherein the solution of the conjugate acid comprises an organic solvent.

4. The process of claim 1, further comprising reacting additional $CO_2$ with the recovered CPI.

5. The process of claim 1, wherein the $CO_2$ is obtained from air.

6. The process of claim 1, wherein the product of the transferring comprises a carbonate.

7. The process of claim 1, wherein the product of the transferring comprises a species selected from the group consisting of a polycarbonate, a polyurethane, and a metal carbonate.

8. The process of claim 1, wherein the CPI is incorporated into a polymeric material.

* * * * *